(12) United States Patent
Kim et al.

(10) Patent No.: US 7,361,328 B2
(45) Date of Patent: Apr. 22, 2008

(54) METHOD OF PREPARING ZSM-5 USING VARIABLE TEMPERATURE WITHOUT ORGANIC TEMPLATE

(75) Inventors: Wha-Jung Kim, Gyeonggi (KR); Shin-Dong Kim, Seoul (KR)

(73) Assignee: SK Corporation, Seoul (KR)

( * ) Notice: Subject to any disclaimer, the term of this patent is extended or adjusted under 35 U.S.C. 154(b) by 490 days.

(21) Appl. No.: 10/540,717

(22) PCT Filed: Dec. 22, 2003

(86) PCT No.: PCT/KR03/02801

§ 371 (c)(1),
(2), (4) Date: Jun. 24, 2005

(87) PCT Pub. No.: WO2004/058643

PCT Pub. Date: Jul. 15, 2004

(65) Prior Publication Data

US 2006/0111234 A1    May 25, 2006

(30) Foreign Application Priority Data

Dec. 30, 2002   (KR) ..................... 10-2002-0087217
Nov. 27, 2003   (KR) ..................... 10-2003-0085197

(51) Int. Cl.
*C01B 39/00* (2006.01)
(52) U.S. Cl. ................ 423/710; 423/711; 423/DIG. 22
(58) Field of Classification Search ................ 423/710, 423/711, DIG. 22
See application file for complete search history.

(56) References Cited

U.S. PATENT DOCUMENTS

| 4,257,885 A | | 3/1981 | Grose et al. |
| 4,565,681 A | | 1/1986 | Kühl |
| 5,089,243 A | * | 2/1992 | Thome et al. ............... 423/710 |
| 5,240,892 A | | 8/1993 | Klocke |
| 5,254,327 A | | 10/1993 | Martinez et al. |

* cited by examiner

*Primary Examiner*—Vickie Kim
*Assistant Examiner*—Matthew E Hoban
(74) *Attorney, Agent, or Firm*—Darby & Darby P.C.

(57) ABSTRACT

Disclosed is a method of preparing ZSM-5 having substantially 100% crystallinity by using variable temperatures in the absence of an organic template, characterized in that a reaction mixture having a molar composition of $M_2O/SiO_2$ (M: alkali metal ion) of 0.07-0.14, $H_2O/SiO_2$ of 15-42 and $SiO_2/Al_2O_3$ of 20-100 is nucleated at relatively high temperatures (180-210° C.) and then crystallized at relatively low temperatures (130-170° C.), thus easily controlling a crystal size and a particle size distribution of the ZSM-5.

20 Claims, 20 Drawing Sheets

2 Theta [deg.]

METHOD OF PREPARING ZSM-5 USING VARIABLE TEMPERATURE WITHOUT ORGANIC TEMPLATE

CROSS-REFERENCE TO PRIOR APPLICATION

This is a U.S. National Phase application under 35 U.S.C. §371 of International Patent Application No. PCT/KR2003/002801 filed Dec. 22, 2003. The International Application was published in English on Jul. 15, 2004 as WO 2004/058643 A1 under PCT Article 21(2).

TECHNICAL FIELD

The present invention relates to preparation methods of ZSM-5 using variable temperatures without organic templates. More specifically, the present invention is directed to a method of preparing ZSM-5, characterized in that a reaction mixture for use in preparation of ZSM-5 is subjected to a two-step process, that is, nucleation at relatively high temperatures and then crystallization at relatively low temperatures, without the use of an organic template and a crystallization seed, thus easily controlling a crystal size and a particle size distribution with uniform particle size distribution and achieving substantial 100% crystallinity. In particular, upon the nucleation, the reaction time is adjusted to freely control both the crystal size and the particle size distribution.

BACKGROUND ART

Since ZSM-5 having high silica content has been developed for the first time by Mobil Co. in the early 1970s, intensive research on such a material has been performed, due to its unique catalytic activity and shape selectivity resulting from the characteristics of ZSM-5 as a molecular sieve.

Unlike conventional alumino-silicate zeolites, ZSM-5 is generally prepared using various types of organic materials as a templating agent. Among organic materials known to be effective for templating ZSM-5 structure, tetrapropylammonium cation has been known the most effective. In practice, commercial ZSM-5, currently available, has been synthesized using such a tetrapropylammonium cation. However, although tetrapropylammonium has excellent template effects, research into the preparation of ZSM-5 without the use of such an organic template has been conducted. As a result, some preparation processes were developed.

The reason why the organic template is not used in the synthesis of ZSM-5 is expensive and very toxic, which can contaminate the environments. When ZSM-5 is synthesized using the organic template, secondary costs for treating a toxic organic material contained in unreactants are required. Also, the dangers of environmental contamination become very high.

In addition, ZSM-5 prepared by use of the above organic material should be subjected to a calcining step at 550° C. to pyrolytically remove the organic material present in channel structure of the ZSM-5, before being used as a catalyst. However, when the organic material is removed by the calcining step, the incomplete pyrolysis thereof results in pore blockage of ZSM-5, thus drastically decreasing the activity of the catalyst. Further, the use of the organic template is disadvantageous in terms of additional costs due to the calcining step, and air contamination by gases discharged upon pyrolysis of the organic material.

To overcome the above problems, in U.S. Pat. No. 4,257,885 (1981) to Flanigen et al., there is disclosed a method of synthesizing ZSM-5 with or without the use of a crystallization seed in the absence of an organic material. However, the above method has a drawback in that a reaction period is 68-120 hours.

Further, U.S. Pat. No. 4,565,681 (1986) to Kuhl discloses a method of synthesizing ZSM-5 at 150-200° C. for 8-48 hours by mixing a silica source with an acid-treated alumina source in the absence of an organic material. Furthermore, U.S. Pat. No. 5,240,892 (1993) to Klocke discloses a method of synthesizing ZSM-5 from a silica precursor neutralized with sulfuric acid in the absence of an organic template. However, the above methods have only 75% crystallinity, in spite of the reaction occurring at relatively high temperatures of 220° C. by using a crystallization seed acting to promote the crystallization.

Likewise, U.S. Pat. No. 5,254,327 (1993) to Martinez et al. discloses a method of synthesizing ZSM-5 by dissolving sodium aluminate in caustic soda without the use of a crystallization seed in the absence of an organic template, to prepare an aqueous solution, which is then mixed with colloidal silica However, this method requires a reaction period not less than 48 hours.

As mentioned above, the conventional methods of synthesizing ZSM-5 in the absence of the organic template are summarized by using the crystallization seed for promoting the crystallization, or neutralizing the alumina source with an acid solution to form a proper gel precursor, but have the disadvantage of a lengthy reaction period.

DISCLOSURE OF THE INVENTION

Leading to the present invention, intensive and thorough research into synthesis methods of ZSM-5, carried out by the present inventors aiming at problems encountered in the related art, resulted in the finding that a reaction mixture for preparation of ZSM-5 is subjected to a two-step variable temperature process, for example, nucleating at relatively high temperatures and then crystallizing at relatively low temperatures, without the use of an organic template and a crystallization seed, whereby a crystal size and a particle size distribution of the resulting ZSM-5 can be freely controlled. Moreover, ZSM-5 having substantially 100% crystallinity as well as desirable purity may be prepared.

Therefore, it is an object of the present invention to provide a method of preparing ZSM-5 having a high crystallinity while freely controlling a crystal size and crystal size distribution, without the use of an organic template and a crystallization seed.

It is another object of the present invention is to provide a method of easily preparing ZSM-5 having a uniform crystal size distribution and high crystallinity in wider composition ranges, instead of very narrow synthetic ranges regarded as the problem in the absence of the organic template.

In accordance of the present invention, there is provided a method of preparing ZSM-5, comprising the following steps of:

mixing a silica source, an alkali metal oxide source, an alumina source and water, to prepare a reaction mixture having a molar composition of $M_2O/SiO_2$ (M: alkali metal ion) of 0.07-0.14, $H_2O/SiO_2$ of 15-42 and $SiO_2/Al_2O_3$ of 20-100;

maintaining the reaction mixture at 180-210° C. for a reaction time controlled in a range of 2-20 hours according to an intended crystal size and a particle size distribution of the ZSM-5, to obtain a nucleated reaction mixture; and maintaining the nucleated reaction mixture at 130-170° C. for 10-200 hours to form crystals of the ZSM-5.

According to a first preferred embodiment of the present invention, there is provided a method of preparing ZSM-5, comprising the following steps of:

admixing a silica source, an alkali metal oxide source and water, to prepare a first aqueous solution;

separately admixing an alumina source, an alkali metal oxide source and water, to prepare a second aqueous solution;

mixing the first aqueous solution with the second aqueous solution while being optionally added with water, to prepare a reaction mixture having a molar composition of $M_2O/SiO_2$ of 0.07-0.14, $H_2O/SiO_2$ of 15-42 and $SiO_2/Al_2O_3$ of 20-100;

maintaining the reaction mixture at 180-210° C. for a reaction time controlled in the range of 2-20 hours according to an intended crystal size and a particle size distribution of the ZSM-5, to obtain a nucleated reaction mixture; and maintaining the nucleated reaction mixture at 130-170° C. for 10-200 hours to form crystals of the ZSM-5.

According to a second preferred embodiment of the present invention, there is provided a method of preparing ZSM-5, comprising the following steps of:

admixing a silica source, an alkali metal oxide source and water, to prepare a first aqueous solution;

separately admixing an alumina source and water, to prepare a second aqueous solution;

mixing the first aqueous solution with the second aqueous solution while being optionally added with water, to prepare a reaction mixture having a molar composition of $M_2O/SiO_2$ of 0.07-0.14, $H_2O/SiO_2$ of 15-42 and $SiO_2/Al_2O_3$ of 20-100;

maintaining the reaction mixture at 180-210° C. for a reaction time controlled in the range of 2-20 hours according to an intended crystal size and a particle size. distribution of the ZSM-5, to obtain a nucleated reaction mixture; and maintaining the nucleated reaction mixture at 130-170° C. for 10-200 hours to form crystals of the ZSM-5.

BRIEF DESCRIPTION OF THE DRAWINGS

The above and other aspects, features and other advantages of the present invention will be more clearly understood from the following detailed description taken in conjunction with the accompanying drawings, in which.

BEST MODE FOR CARRYING OUT THE INVENTION

Figure 1:
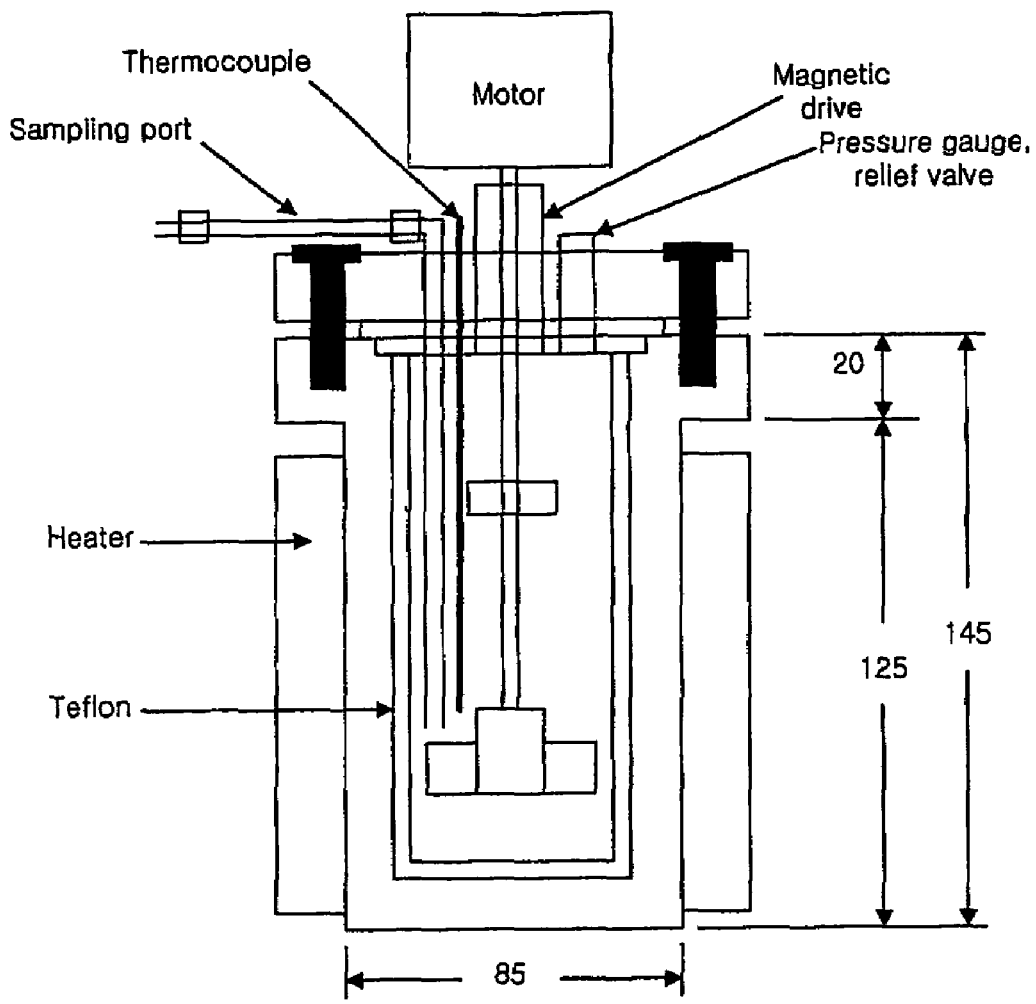
FIG. 1 is a schematic view showing an autoclave used for preparation of ZSM-5, according to the present invention.

Based on the present invention, a reaction mixture for use in preparation ZSM-5 is subjected to a two-step process, that is, nucleation and crystallization, thereby providing a preparation method of ZSM-5 having substantially 100% crystallinity while easily controlling a crystal size and a particle size distribution even in the absence of an organic template and a crystallization seed as a crystallization promoter. As such, the nucleation is performed at relatively high temperatures (180-210° C.) and the crystallization is carried out at relatively low temperatures (130-170° C.) until the crystallinity reaches substantially 100% with preference.

Meanwhile, the crystal size is a very important factor for a catalytic reaction. In particular, it is preferred that the crystal size is smaller for the catalytic reaction requiring a rapid diffusion of a reactant and a product in pores of the zeolite. Further, in cases of catalytic reactions requiring not-too strong an acid site, the crystal size should not be too small. Hence, upon synthesizing ZSM-5 in the absence of the organic template by a hydrothermal reaction, the size of the resulting crystals should be properly controlled. For this, in the present invention, the two-step reaction is performed at the above variable temperatures to achieve the crystallization, thus easily controlling the crystal size and the particle size distribution important for the catalytic activity.

In the present invention, the nucleation refers to a pure nucleation showing no presence of crystals of ZSM-5 on an XRD, while the crystallization refers to the increase of crystallinity over time on the XRD.

In accordance with the preferred embodiment of the present invention, a reaction mixture formation is performed differently from the conventional ones, whereby superior ZSM-5 can be easily synthesized in a wider composition range, instead of very narrow synthetic ranges regarded as the problem upon using no organic template.

First, a silica source, an alkali metal oxide source, an alumina source and water are mixed to prepare a reaction mixture for preparation of ZSM-5. The preparation of the reaction mixture may be performed through a single-step or multi-step. At this point, although the temperature upon mixing the reactants is not particularly limited, it is typically room temperature. In the present invention, the reaction mixture is controlled to have a molar composition of $M_2O/SiO_2$ of about 0.07-0.14 (M: alkali metal ion), $H_2O/SiO_2$ of about 15-42 and $SiO_2/Al_2O_3$ of about 20-100.

In cases where the reaction mixture is obtained by the single step, a mixing sequence of the ingredients is not particularly limited. For example, the silica source, the-alkali metal oxide source, water and the alumina source, in order, may be mixed. Otherwise, water, the alumina source, the alkali metal oxide source and the silica source may be sequentially mixed.

However, since whether the silica source and/or the alumina source in the reaction mixture is present in an aqueous solution of a uniform gel state affects the quality of the resultant ZSM-5, a multi-step mixing procedure as mentioned below is preferably adopted, instead of the single step mentioned above.

According to a first preferred embodiment of the present invention, the silica source, the alkali metal oxide source (e.g., alkali metal hydroxide) and water are mixed to prepare a first aqueous solution. As such, it is preferable that the amount of the silica source in the first aqueous solution is controlled in the range of about 21.5-26.7 wt %. This is because silica is not uniformly dissolved in water if water is present in either excessively small or large amount in the first aqueous solution. Separately, the alumina source, the alkali metal oxide source and water are mixed to obtain a second aqueous solution. As such, the alumina source in the second aqueous solution is controlled in the amount of about 0.9-4.4 wt %. This is also because the alumina source should uniformly dissolved in water. Then, the second aqueous solution is added to the first aqueous solution. In consideration of the concentrations of the first aqueous solution and the second aqueous solution, in case that the $H_2O/SiO_2$ in the reaction mixture is below the required mol ratio, water is further added as a balance component.

According to a second preferred embodiment of the present invention, the silica source, the alkali metal oxide source (e.g., alkali metal hydroxide) and water are mixed to obtain an aqueous silica source solution. As mentioned above, the amount of the silica source in the aqueous solution is preferably controlled in about 21.5-26.7 wt %. Separately, the alumina source is dissolved in water to prepare an aqueous alumina source solution, and is controlled in the amount of about 0.9-4.4 wt % in the aqueous alumina source solution Then, the aqueous alumina source solution is added to the aqueous silica source solution. As such, considering the concentrations of the aqueous silica source solution and the aqueous alumina source solution, in case that the $H_2O/SiO_2$ in the reaction mixture is below a required mol ratio, water is further added as a balance component. Thereby, the reaction mixture in the state of gel is simply obtained.

As conventionally known, when the alumina source or the silica source is neutralized with an acid solution upon preparation of ZSM-5, since a precipitate such as sodium sulfate is generated, it is difficult to maintain consistency in the reaction composition. Therefore, the reaction composition essential for the synthesis of pure ZSM-5 cannot be accurately adjusted. However, the preparation method of ZSM-5 according to the preferred embodiments of the present invention is advantageous in that neither a neutralization by an acid nor heating upon dissolution are not required, through the both relatively simple mixing method of the reactants and the two-step reaction at variable temperatures.

Thereafter, the prepared reaction mixture is subjected to nucleation at the reaction temperature maintained at about 180-210° C. for the reaction time controlled in the range of 2-20 hours, depending on the crystal size and the particle size distribution of ZSM-5 to be prepared. Subsequently, the nucleated reaction mixture is crystallized at about 130-170° C. for about 10-200 hours.

As mentioned above, the starting composition of the present invention, which has an influence on the properties of the resultant ZSM-5, is specifically described, below.

As for the alkali metal oxide source, a proper alkali metal is exemplified by sodium (Na), lithium (Li), potassium (K), or cesium (Ce). Among them, sodium is preferable. In particular, it is most preferred that the alkali metal oxide source is used in the form of hydroxide.

The silica source is preferably selected from the group consisting of colloidal silica, sodium silicate, white carbon and boehmite, and is representatively exemplified by colloidal silica, for example, 40 wt % Ludox AS-40 (Dupont Chem. Co.).

In addition, the alumina serves as an important ingredient for the nucleation upon using no organic template, and the alumina source is exemplified by sodium aluminate and aluminum hydroxide.

As such, the molar ratio of $SiO_2/Al_2O_3$ in the reaction mixture for use in the preparation of ZSM-5 is preferably adjusted in the range of about 20-100. If the molar ratio is less than 20, it is difficult to synthesize pure ZSM-5 due to the formation of a mordenite phase. Meanwhile, if the molar ratio exceeds 100, the nucleation per se cannot be performed and thus pure ZSM-5 is difficult to synthesize. More preferably, the above mol ratio is in the range of about 20-67. Although U.S. Pat. No. 5,240,892 discloses a mol ratio of $SiO_2/Al_2O_3$ not more than 50 for the production of ZSM-5, the present invention provides the synthesis of ZSM-5 with substantially 100% crystallinity and superior morphology even though the molar ratio of $SiO_2/Al_2O_3$ is not less than 50.

Further, water used for the reaction mixture of the present invention is a very important ingredient for hydrothermal synthesis, with distilled water being preferred. The amount of water in the reaction mixture greatly affects the crystallization. In the present invention, the molar ratio of $H_2O/SiO_2$ is adjusted in the range of about 15-42, and preferably, about 22.5-29. Excessive addition of water results in a decreased crystallization rate and thus drastically increased crystallization time, thus lowering a reaction yield. Thus, the adding amount of water should be adjusted in the required range.

According to the present invention, the reaction mixture having the composition range as described above is first subjected to the nucleation step of the two-step process. To induce the nucleation, the reaction mixture is reacted at about 180-210° C. for about 2-20 hours. At this time, it is preferred that the molar ratio of $M_2O/SiO_2$ is adjusted depending on the given molar ratio of $SiO_2/Al_2O_3$ in the reaction mixture. In consideration thereof, it is required to differently control the nucleation time. The reason is as follows.

In cases where the molar ratio of $SiO_2/Al_2O_3$ is relatively high (i.e., $SiO_2/Al_2O_3$=29 or higher), since pure ZSM-5 can be synthesized in the range of $M_2O/SiO_2$ of about 0.09-0.14, the nucleation time is relatively freely controlled. In particular, when the molar ratio of $SiO_2/Al_2O_3$ is 29 or higher, the resultant ZSM-5 becomes to have a hexagonal crystal morphology.

On the other hand, when the mol ratio of $SiO_2/Al_2O_3$ is low (i.e., $SiO_2/Al_2O_3$ less than 29), the molar ratio of $M_2O/SiO_2$ higher than 0.1 results in simultaneous production of the ZSM-5 and the mordenite phase or production of only the mordenite phase. Thus, the molar ratio of $M_2O/SiO_2$ should be maintained in the range not more than 0.1. However, if the molar ratio of $M_2O/SiO_2$ is less than 0.07, it is difficult to bring about the crystallization. Hence, it is preferred that the molar ratio of $M_2O/SiO_2$ is maintained in the range of about 0.07-0.1. In this case, the nucleation rate and the crystallization rate become slow, and thus the crystallization time prolongs. In particular, if the molar ratio of $SiO_2/Al_2O_3$ is less than 29, the resultant ZSM-5 becomes to have a spiral crystal morphology.

Particularly, at the molar ratio of $SiO_2/Al_2O_3$ not more than 22 at which the mordenite phase is produced, since the pure ZSM-5 is difficult to synthesize, the nucleation time should be long maintained to the extent of about 10-20 hours. In such a case, the subsequent crystallization rate becomes very slow, and the crystallization time is maintained in the range of about 96-200 hours to obtain pure ZSM-5.

In the present invention, if the nucleation as the first step of the two-step process is carried out in an excessively short period, the results similar to single low temperature synthesis are obtained. On the contrary, if the nucleation time is too long, the results similar to single high temperature synthesis are obtained. Accordingly, the crystal size distribution becomes very wide and limitations are imposed on the use of the ZSM-5 as the catalyst. In particular, the nucleation temperature should be set to be relatively higher than the crystallization temperature. If the nucleation temperature is lower than the proper level, it is difficult to generate a rapid nucleation. Whereas, if it is higher than the proper level, the nucleation and the crystallization take place at the same time, and thus it is difficult to control the crystal size distribution. As a consequence, the nucleation temperature of the present invention is controlled in the range of about 180-210° C., and preferably, about 180-190° C.

After the completion of the nucleation, the crystallization takes place to increase the crystallinity. In practice, it is preferable that the crystallization occurs until the crystallinity reaches substantially 100%. The temperature and time conditions required for the crystallization are determined in consideration of the composition of the reaction mixture, etc. Generally, the crystallization occurs at about 130-170°

C., and preferably, about 150-170° C., relatively lower than the nucleation temperature, for about 10-200 hours.

According to the method of the present invention, the ZSM-5 can be prepared while an average crystal size is freely adjusted in the range of 1-6 μm, and preferably, 2-3 μm, with a very narrow particle size distribution.

Determination of the phase and calculation of the crystallinity of the reaction product obtained through the above processes are based upon the collection of data of 2θ 7-9° and 22-25°, corresponding to characteristic peaks of ZSM-5, by use of an X-ray diffraction analyzer (Rigaku Model D/Max III). Further, the morphology of the product can be confirmed by means of a scanning electron microscope (SEM; Akasi Alpha 25A), and, to measure a specific surface area of the product, a BET (Micrometrics Co., ASAP 2010) method is typically adopted.

Having generally described this invention, a further understanding can be obtained by reference to specific examples which are provided herein for purposes of illustration only and are not intended to be limiting unless otherwise specified.

EXAMPLE 1

Figure 2A:
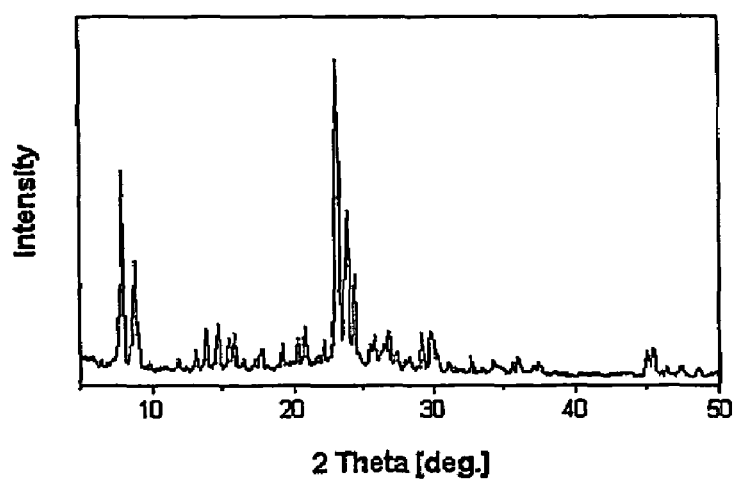
FIG. 2a is a view showing an XRD (X-ray diffraction diagram) pattern of ZSM-5 prepared in Example 1 of the present invention.
Figure 2B:
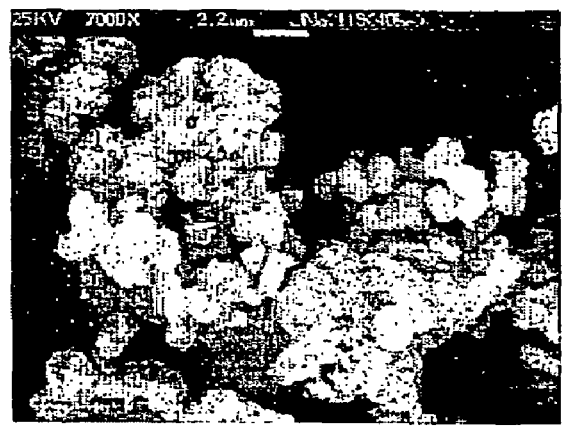
FIG. 2b is a SEM (Scanning Electron Micrograph) of ZSM-5 prepared in Example 1 of the present invention.

60 g of Ludox AS-40 as a silica source was placed into a beaker 1, to which 21.4 g of a 10 wt % NaOH solution was slowly added, while performing stirring at 200 rpm, and then 30 g of distilled water was further added, followed by stirring at 200 rpm for three hours. Separately, 1.65 g of powders of sodium aluminate was charged into a beaker 2, together with 48.8 g of distilled water and 8.8 g of a 10 wt % NaOH solution, and admixed using a magnetic stirrer for three hours. Thereafter, the solution of the beaker 2, and 18.8 g of additional distilled water were slowly added to the solution of the beaker 1, and then mixed for one hour. Subsequently, the resultant mixture was transferred into a 300 ml Teflon container, and the reaction temperature was increased up to 190° C. while performing stirring at 200 rpm by use of an autoclave equipped with a sampling port shown in FIG. 1, and maintained for two hours. Then, the reaction temperature was cooled to 150° C., and maintained for 40 hours. After completion of the reaction, the reaction product was filtered with a membrane filter having a pore size of 0.2 μm, sufficiently washed using distilled water, dried at 100° C. for ten hours, and then analyzed for properties thereof FIG. 2a shows XRD pattern of the prepared reaction product, and FIG. 2b shows a particle size distribution and a SEM thereof.

Further, a BET surface area and an average crystal size are represented in Table 1, below.

In the present example, the reaction mixture has the following molar composition:

$SiO_2/Al_2O_3=67$, $Na_2O/SiO_2=0.115$, $H_2O/SiO_2=22.5$.

EXAMPLE 2

Figure 3A:
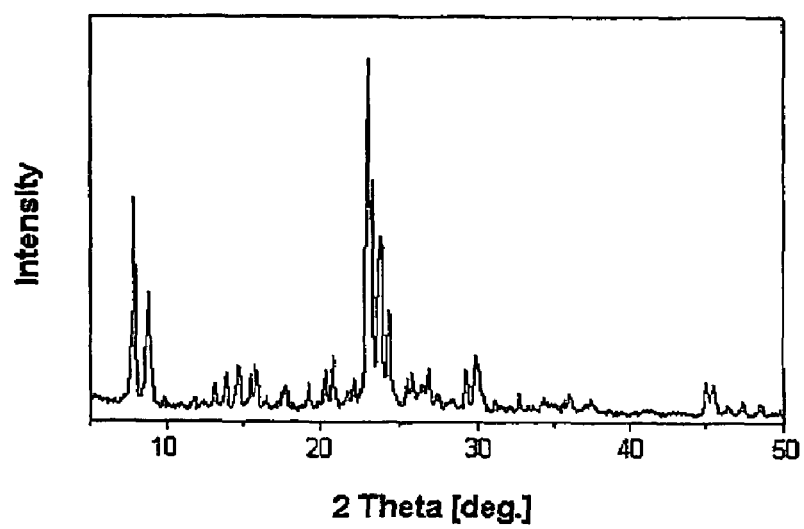
FIG. 3a is a view showing an XRD pattern of ZSM-5 prepared in Example 2 of the present invention.
Figure 3B:
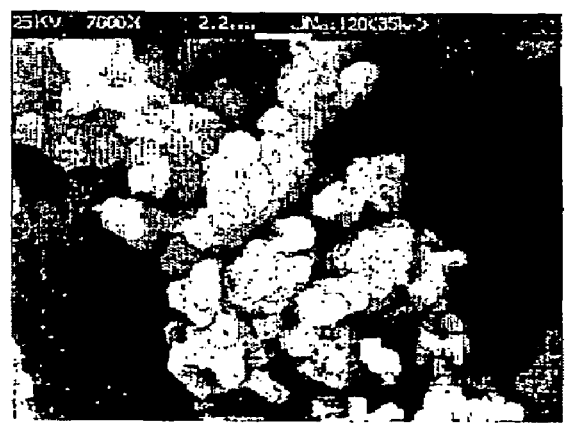
FIG. 3b is a SEM of ZSM-5 prepared in Example 2 of the present invention.

60 g of Ludox AS-40 as a silica source was introduced into a beaker 1, to which 21.4 g of a 10 wt % NaOH solution was slowly added while performing stirring at 200 rpm and then 30 g of distilled water was further added. Subsequently, stirring was performed at 200 rpm for three hours. Into a beaker 2, powders of sodium aluminate was added in an amount of 2.0 g, together with 49.4 g of distilled water and 7.5 g of a 10 wt % NaOH solution, and admixed using the magnetic stirrer for three hours. Thereafter, the solution of the beaker 2 and 19.4 g of additional distilled water were slowly added to the solution of the beaker 1, and then mixed for one hour. Subsequently, the reaction temperature of the resultant mixture was increased up to 190° C. while performing stirring at 200 rpm by use of the same autoclave as in Example 1, and maintained for two hours. Then, the reaction temperature was cooled to 150° C., and maintained for 35 hours. After the completion of the reaction, the resultant reaction product was analyzed for properties thereof in the same manner as in Example 1. The results are shown in FIGS. 3a and 3b, and Table 1.

In the present example, the reaction mixture has the following molar composition:

$SiO_2/Al_2O_3=56$, $Na_2O/SiO_2=0.115$, $H_2O/SiO_2=22.5$.

EXAMPLE 3

Figure 4A:
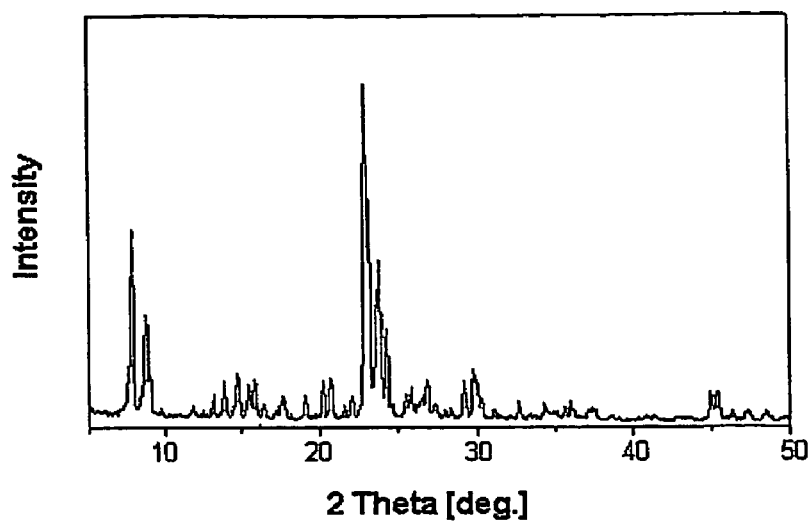
FIG. 4a is a view showing an XRD pattern of ZSM-5 prepared in Example 3 of the present invention.
Figure 4B:
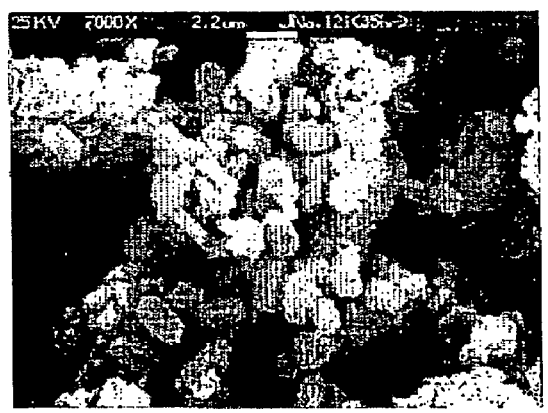
FIG. 4b is a SEM of ZSM-5 prepared in Example 3 of the present invention.

In a beaker 1, 60 g of Ludox AS-40 as a silica source was introduced, to which 21.4 g of a 10 wt % NaOH solution was slowly added while performing stirring at 200 rpm, and 30 g of distilled water was further added, followed by stirring at 200 rpm for three hours. Separately, 2.2 g of powders of sodium aluminate was charged into a beaker 2, together with 57 g of distilled water and 1.8 g of a 10 wt % NaOH solution, and admixed by use of the magnetic stirrer for three hours. Thereafter, the solution of the beaker 2 and 27 g of additional distilled water were slowly added to the solution of the beaker 1, and mixed for one hour. Then, the reaction temperature of the resultant mixture was increased up to 190° C. while performing stirring at 200 rpm by use of the same autoclave as in Example 1, and maintained for two hours. Then, the reaction temperature was cooled to 150° C., and maintained for 35 hours. After the completion of the reaction, the resultant reaction product was analyzed for properties thereof in the same manner as in Example 1. The results are shown in FIGS. 4a and 4b, and Table 1.

In the present example, the reaction mixture has the following molar composition:

$SiO_2/Al_2O_3=50$, $Na_2O/SiO_2=0.10$, $H_2O/SiO_2=22.5$.

EXAMPLE 4

Figure 5A:
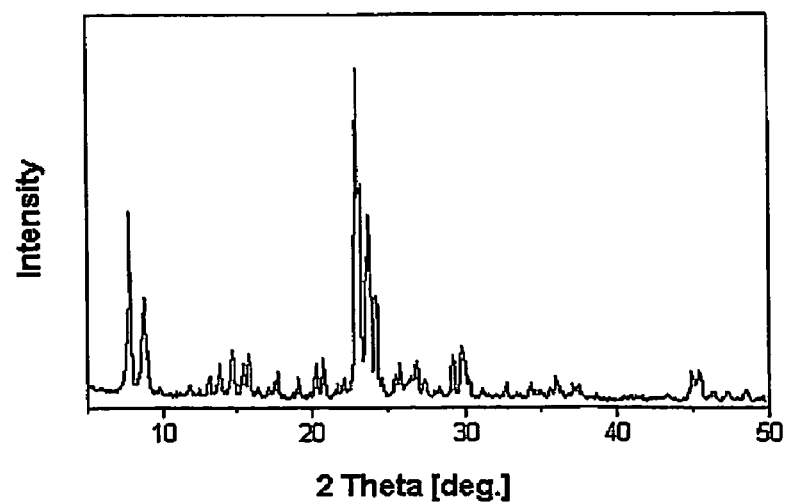
FIG. 5a is a view showing an XRD pattern of ZSM-5 prepared in Example 4 of the present invention.
Figure 5B:
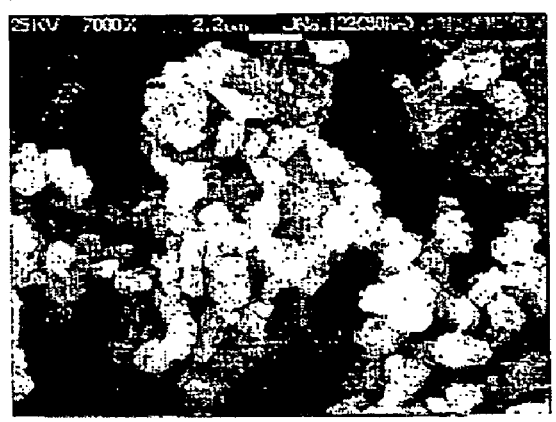
FIG. 5b is a SEM of ZSM-5 prepared in Example 4 of the present invention.

60 g of Ludox AS-40 as a silica source was introduced into a beaker 1, to which 21.4 g of a 10 wt % NaOH solution was slowly added while performing stirring at 200 rpm and then 30 g of distilled water was further added, followed by stirring at 200 rpm for three hours. Separately, 2.2 g of powders of sodium aluminate was introduced into a beaker 2, together with 46 g of distilled water and 6.6 g of a 10 wt % NaOH solution, and admixed using the magnetic stirrer for three hours. Thereafter, the solution of the beaker 2 was slowly added to the solution of the beaker 1, along with 16 g of additional distilled water, and then mixed for one hour. The reaction temperature of the resultant mixture was increased up to 190° C. while performing stirring at 200 rpm by use of the same autoclave as in Example 1, and maintained for two hours. Subsequently, the reaction temperature was cooled to 150° C., and maintained for 30 hours. After the completion of the reaction, the resultant reaction product was analyzed for properties thereof in the same manner as in Example 1. The results are shown in FIGS. 5a and 5b, and Table 1.

In the present example, the reaction mixture has the following molar composition:

$SiO_2/Al_2O_3=50$, $Na_2O/SiO_2=0.115$, $H_2O/SiO_2=22.5$.

COMPARATIVE EXAMPLE 1

Figure 6A:
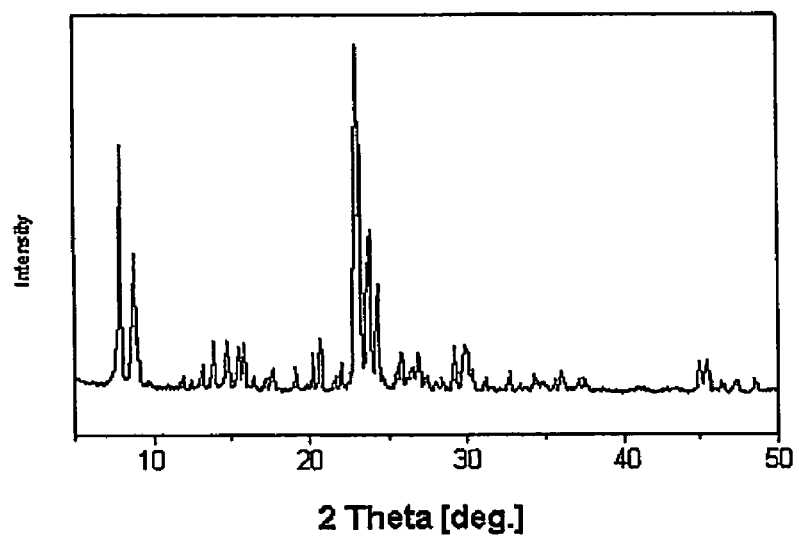
FIG. 6a is a view showing an XRD pattern of ZSM-5 prepared in Comparative Example 1 of the present invention.
Figure 6B:
FIG. 6b is a SEM of ZSM-5 prepared in Comparative Example 1 of the present invention.

60 g of Ludox AS-40 silica source was introduced into a beaker 1, to which 21.4 g of a 10 wt % NaOH solution was slowly added while performing stirring at 200 rpm, and 30 g of distilled water was further added, followed by stirring at 200 rpm for three hours. Separately, 2.2 g of powders of sodium aluminate, 46 g of distilled water and 6.6 g of a 10 wt % NaOH solution were placed into a beaker 2, and admixed using the magnetic stirrer for three hours. Thereafter, the solution of the beaker 2 and 16 g of additional distilled water were slowly added to the solution of the beaker 1, and mixed for one hour. Then, the reaction temperature of the mixture was increased up to 190° C. while performing stirring at 200 rpm by use of the same autoclave as in Example 1, and maintained for nine hours. After the completion of the reaction, the resultant reaction product was analyzed for properties thereof in the same manner as in Example 1. The results are shown in FIGS. 6a and 6b, and Table 1.

In this comparative example, the reaction mixture has the following molar composition:

$SiO_2/Al_2O_3=50$, $Na_2O/SiO_2=0.115$, $H_2O/SiO_2=22.5$.

EXAMPLE 5

Figure 7A:
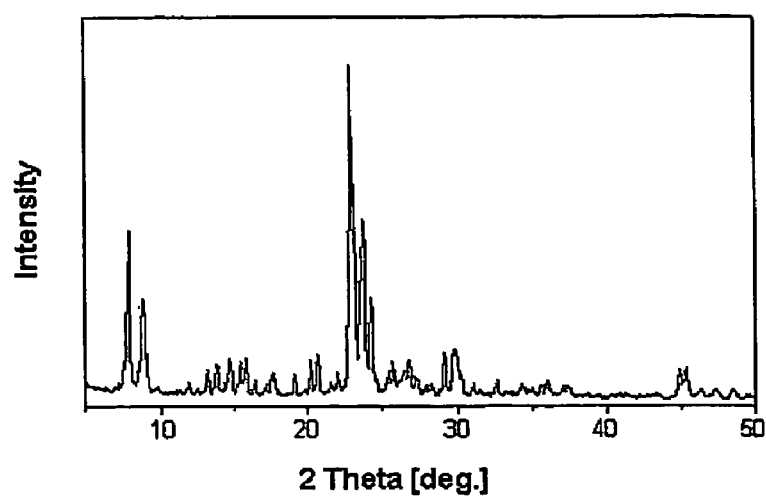
FIG. 7a is a view showing an XRD pattern of ZSM-5 prepared in Example 5 of the present invention.
Figure 7B:
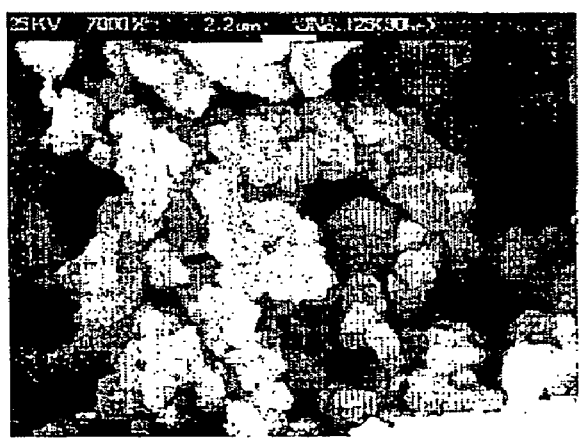
FIG. 7b is a SEM of ZSM-5 prepared in Example 5 of the present invention.

60 g of Ludox AS-40 silica source was placed into a beaker 1, to which 21.4 g of a 10 wt % NaOH solution was slowly added while performing stirring at 200 rpm, and then 30 g of distilled water was additionally added, followed by stirring at 200 rpm for three hours. Separately, 2.2 g of powders of sodium aluminate was placed into a beaker 2, together with 46 g of distilled water and 14.6 g of a 10 wt % NaOH solution, and admixed using the magnetic stirrer for three hours. Thereafter, the solution of the beaker 2 was slowly added to the solution of the beaker 1, along with 16 g of additional distilled water, and mixed for one hour. Then, the reaction temperature of the obtained mixture was increased up to 190° C. while performing stirring at 200 rpm by use of the same autoclave as in Example 1, and maintained for two hours. Subsequently, the reaction temperature was cooled to 150° C., and maintained for 30 hours. After the completion of the reaction, the resultant reaction product was analyzed for properties thereof in the same manner as in Example 1. The results are shown in FIGS. 7a and 7b, and Table 1.

In the present example, the reaction mixture has the following molar composition:

$SiO_2/Al_2O_3=50$, $Na_2O/SiO_2=0.14$, $H_2O/SiO_2=22.5$.

EXAMPLE 6

Figure 8A:
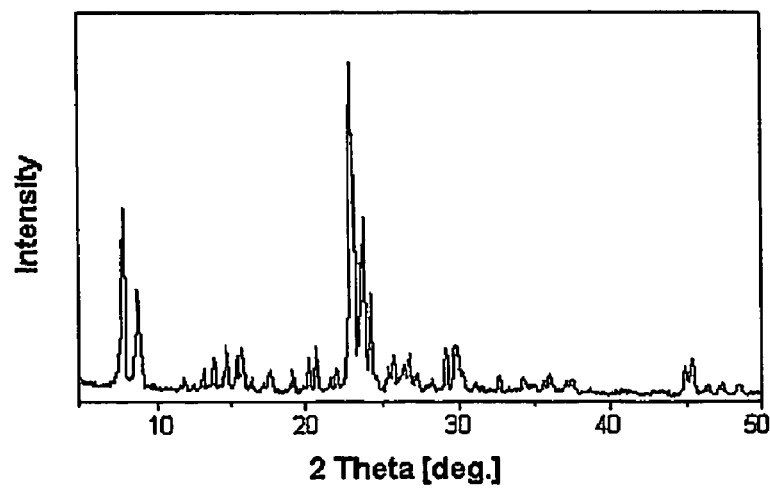
FIG. 8a is a view showing an XRD pattern of ZSM-5 prepared in Example 6 of the present invention.
Figure 8B:
FIG. 8b is a SEM of ZSM-5 prepared in Example 6 of the present invention.

60 g of Ludox AS-40 silica source was introduced into a beaker 1, to which 17.8 g of a 10 wt % NaOH solution was slowly added while performing stirring at 200 rpm, and then 30 g of distilled water was further added, followed by stirring at 200 rpm for three hours. Separately, 2.8 g of powders of sodium aluminate was charged into a beaker 2, together with 54 g of distilled water, and then admixed using the magnetic stirrer for three hours. Thereafter, the solution of the beaker 2 was slowly added to the solution of the beaker 1, along with 14 g of additional distilled water, and then mixed for one hour. Then, the reaction temperature of the obtained mixture was increased up to 190° C. while performing stirring at 200 rpm by use of the same autoclave as in Example 1, and maintained for two hours. Thereafter, the reaction temperature was cooled to 150° C., and maintained for 36 hours. After the completion of the reaction, the resultant reaction product was analyzed for properties thereof in the same manner as in Example 1. The results are shown in FIGS. 8a and 8b, and Table 1.

In the present example, the reaction mixture has the following molar composition:

$SiO_2/Al_2O_3=40$, $Na_2O/SiO_2=0.09$, $H_2O/SiO_2=22.5$.

EXAMPLE 7

Figure 9A:
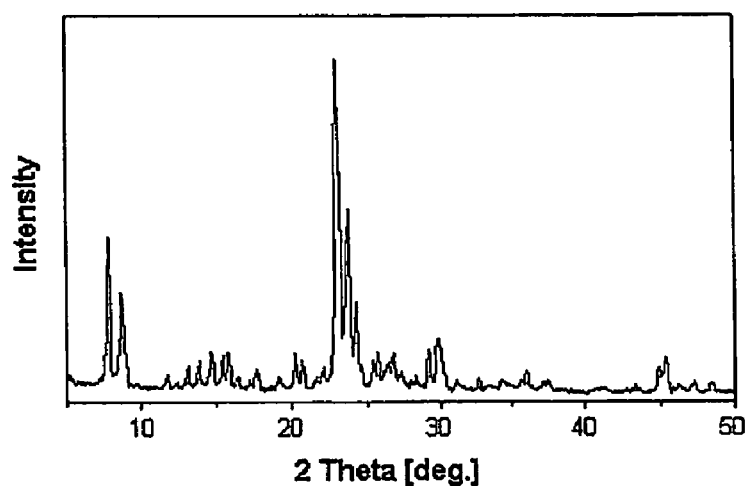
FIG. 9a is a view showing an XRD pattern of ZSM-5 prepared in Example 7 of the present invention.
Figure 9B:
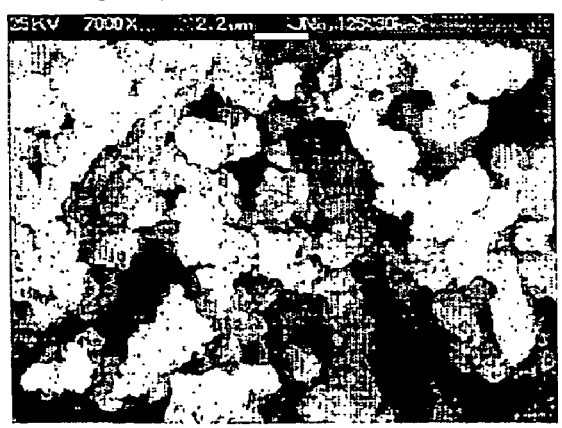
FIG. 9b is a SEM of ZSM-5 prepared in Example 7 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Into a beaker 2, powders of sodium aluminate was added in the amount of 2.8 g, together with 47 g of distilled water and 12.4 g of a 10 wt % NaOH solution, and admixed using the magnetic stirrer for three hours. Thereafter, the solution of the beaker 2 was slowly added to the solution of the beaker 1, along with 17 g of additional distilled water, and then mixed for one hour. The reaction temperature of the obtained mixture was increased up to 190° C. while performing stirring at 200 rpm by use of the same autoclave as in Example 1, and maintained for two hours. Then, the reaction temperature was cooled to 150° C., and maintained for 30 hours. After the completion of the reaction; the resultant reaction product was analyzed for properties thereof in the same manner as in Example 1. The results are shown in FIGS. 9a and 9b, and Table 1.

In the present example, the reaction mixture has the following molar composition:

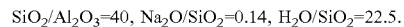

$SiO_2/Al_2O_3=40$, $Na_2O/SiO_2=0.14$, $H_2O/SiO_2=22.5$.

EXAMPLE 8

Figure 10A:
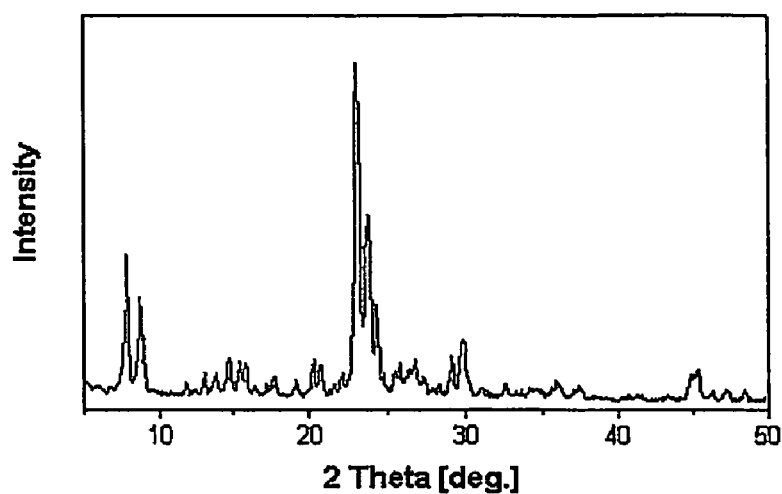
FIG. 10a is a view showing an XRD pattern of ZSM-5 prepared in Example 8 of the present invention.
Figure 10B:
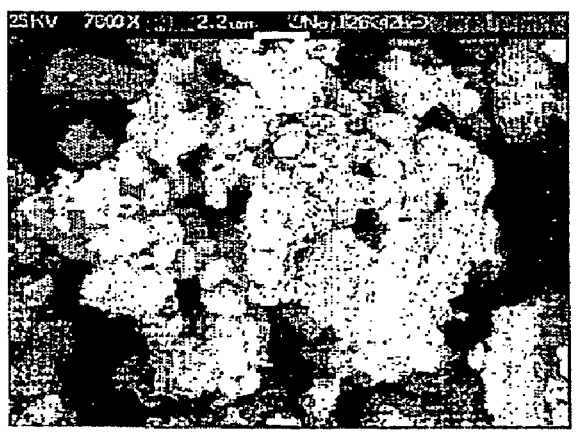
FIG. 10b is a SEM of ZSM-5 prepared in Example 8 of the present invention.

60 g of Ludox AS-40 as a silica source was charged into a beaker 1, to which 21.4 g of a 10 wt % NaOH solution was slowly added while performing stirring at 200 rpm, and then 30 g of distilled water was further added, followed by stirring at 200 rpm for three hours. Separately, 3.3 g of powders of sodium aluminate and 51.6 g of distilled water were charged into a beaker 2, and admixed using the magnetic stirrer for. three hours. Thereafter, the solution of the beaker 2 was slowly added to the solution of beaker 1, along with 21.6 g of additional distilled water, and mixed for one hour. The reaction temperature of the resulting mixture was increased up to 190° C. while performing stirring at 200 rpm by use of the same autoclave as in Example 1, and maintained for two hours. Then, the reaction temperature was cooled to 150° C., and maintained for 42 hours. After the completion of the reaction, the resultant reaction product was analyzed for properties thereof in the same manner as in Example 1. The results are shown in FIGS. 10a and 10b, and Table 1.

In the present example, the reaction mixture has the following molar composition:

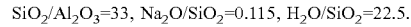

$SiO_2/Al_2O_3=33$, $Na_2O/SiO_2=0.115$, $H_2O/SiO_2=22.5$.

EXAMPLE 9

90 g of Ludox AS-40 silica source was charged into a beaker 1, to which 35 g of a 10 wt % NaOH solution was

Figure 11A:
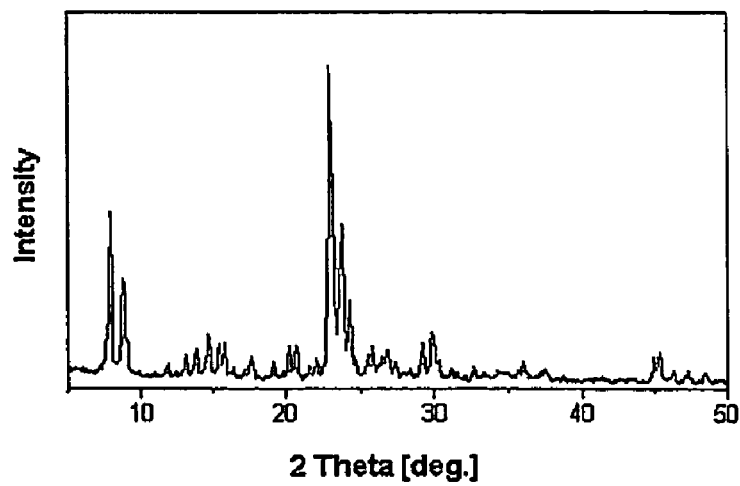
FIG. 11a is a view showing an XRD pattern of ZSM-5 prepared in Example 9 of the present invention.
Figure 11B:
FIG. 11b is a SEM of ZSM-5 prepared in Example 9 of the present invention.

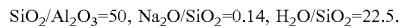

slowly added while performing stirring at 200 rpm, and then 36.9 g of distilled water was further added, followed by stirring at 200 rpm for three hours. Separately, 5.0 g of powders of sodium aluminate was charged into a beaker 2, together with 36.9 g of distilled water, and admixed using the magnetic stirrer for three hours. Thereafter, the solution of the beaker 2 was slowly added to the solution of the beaker 1, and mixed for one hour. After the mixing process was completed, the reaction temperature was increased up to 190° C. while performing stirring at 200 rpm by use of the same autoclave as in Example 1, and then maintained for two hours. Then, the reaction temperature was cooled to 150° C., at which the reaction occurred for 36 hours. After the completion of the reaction, the resultant reaction product was analyzed for properties thereof in the same manner as in Example 1. The results are shown in FIGS. 11a and 11b, and Table 1.

In the present example, the reaction mixture has the following molar composition:

$SiO_2/Al_2O_3=33$, $Na_2O/SiO_2=0.115$, $H_2O/SiO_2=15$.

EXAMPLE 10

Figure 12A:
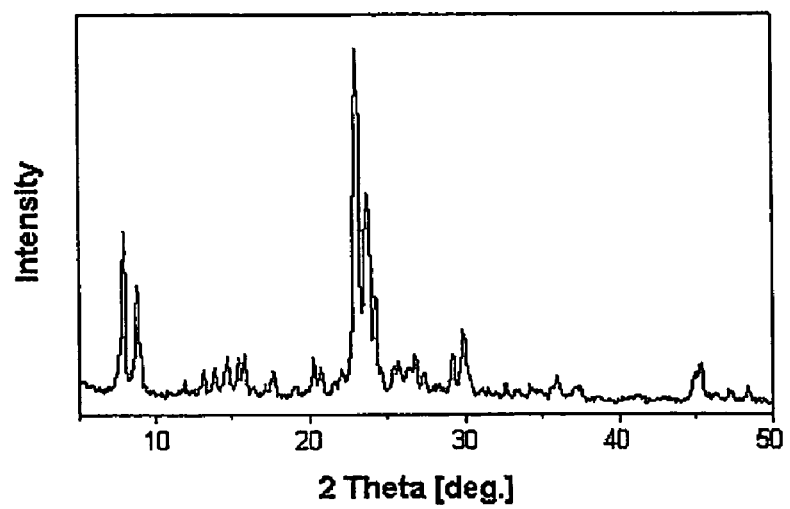
FIG. 12a is a view showing an XRD pattern of ZSM-5 prepared in Example 10 of the present invention.
Figure 12B:
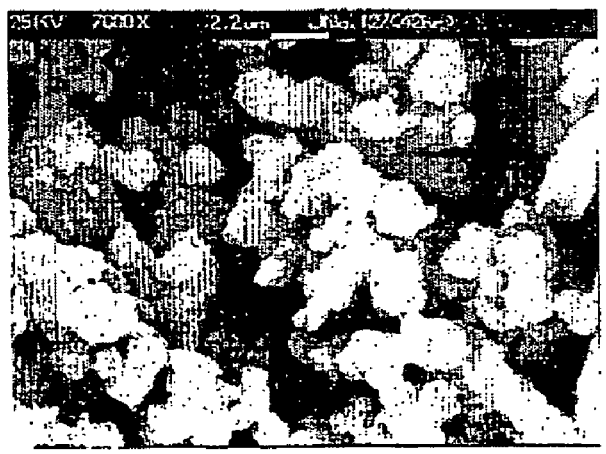
FIG. 12b is a SEM of ZSM-5 prepared in Example 10 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 3.9 g of powders of sodium aluminate was placed into a beaker 2, together with 52.3 g of distilled water, and admixed using the magnetic stirrer for three hours. Thereafter, the solution of the beaker 2 was slowly added to the solution of the beaker 1, along with 22.3 g of additional distilled water, and mixed for one hour. After the mixing process was completed, the reaction temperature was increased up to 190° C. while performing stirring at 200 rpm by use of the same autoclave as in Example 1, and maintained for two hours. Then, the reaction temperature was cooled to 150° C., and maintained for 42 hours. After the completion of the reaction, the resultant reaction product was analyzed for properties thereof in the same manner as in Example 1. The results are shown in FIGS. 12a and 12b, and Table 1.

In the present example, the reaction mixture has the following molar composition:

$SiO_2/Al_2O_3=29$, $Na_2O/SiO_2=0.115$, $H_2O/SiO_2=22.5$.

EXAMPLE 11

Figure 13A:
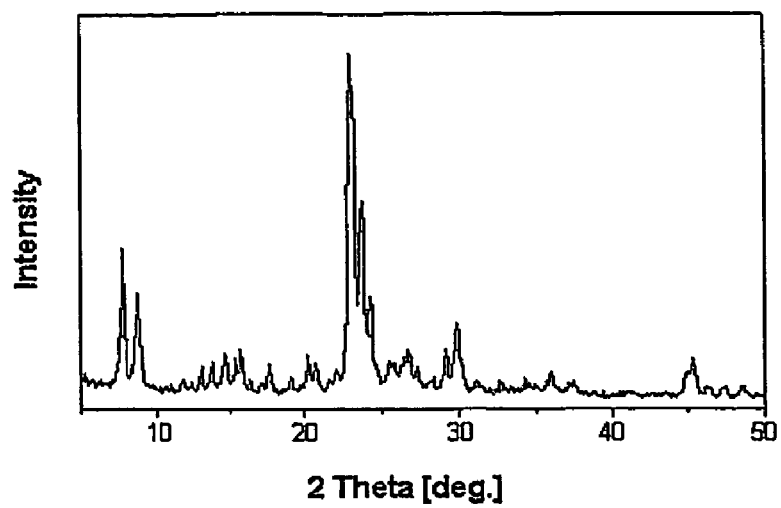
FIG. 13a is a view showing an XRD pattern of ZSM-5 prepared in Example 11 of the present invention.
Figure 13B:
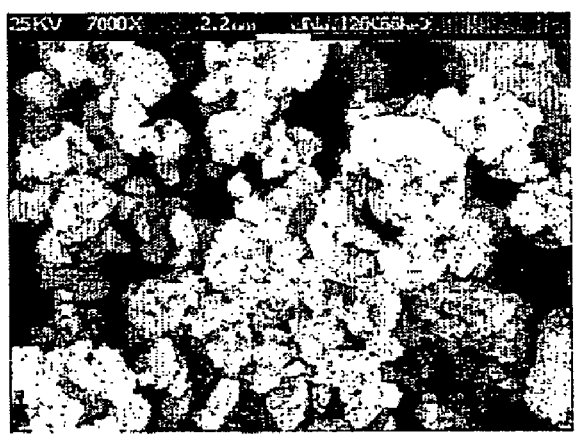
FIG. 13b is a SEM of ZSM-5 prepared in Example 11 of the present invention.

60 g of Ludox AS-40 silica source was introduced into a beaker 1, to which 14.4 g of a 10 wt % NaOH solution was slowly added while performing stirring at 200 rpm, and then 30 g of distilled water was added, followed by stirring at 200 rpm for three hours. Separately, 4.4 g of powders of sodium aluminate and 56 g of distilled water were introduced into a beaker 2, and admixed using the magnetic stirrer for three hours. Thereafter, the solution of the beaker 2 was slowly added to the solution of the beaker 1, along with 26 g of additional distilled water, and mixed for one hour. Then, the reaction temperature of the obtained reaction mixture was increased up to 190° C. while performing stirring at 200 rpm by use of the same autoclave as in Example 1, and maintained for two hours. Then, the reaction temperature was cooled to 150° C., and maintained for 66 hours. After the completion of the reaction, the resultant reaction product was analyzed for properties thereof in the same manner as in Example 1. The results are shown in FIGS. 13a and 13b, and Table 1.

In the present example, the reaction mixture has the following molar composition:

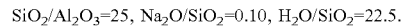
$SiO_2/Al_2O_3=25$, $Na_2O/SiO_2=0.10$, $H_2O/SiO_2=22.5$.

EXAMPLE 12

Figure 14A:
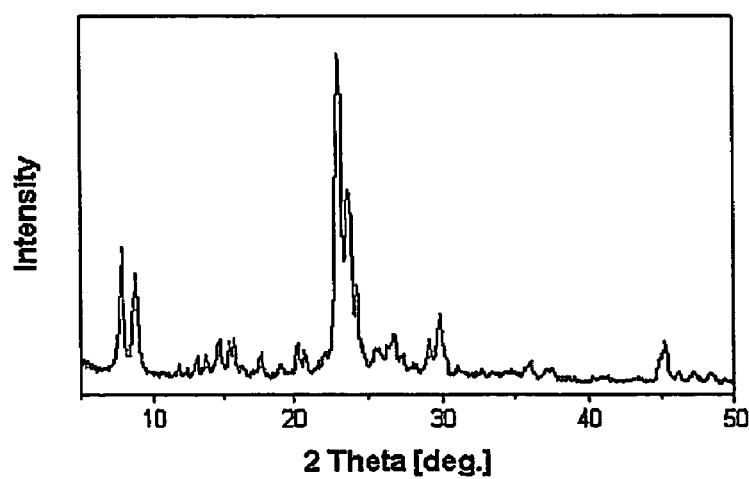
FIG. 14a is a view showing an XRD pattern of ZSM-5 prepared in Example 12 of the present invention.
Figure 14B:
FIG. 14b is a SEM of ZSM-5 prepared in Example 12 of the present invention.

60 g of Ludox AS-40 silica source was placed into a beaker, to which 7.4 g of a 10 wt % NaOH solution was slowly added while performing stirring at 200 rpm, and then 30 g of distilled water was further added, followed by stirring at 200 rpm for three hours. Separately, 5.0 g of powders of sodium aluminate and 59 g of distilled water were introduced into a beaker 2, and admixed using the magnetic stirrer for three hours. Thereafter, the solution of the beaker 2 was slowly added to the solution of the beaker 1, along with 29 g of additional distilled water, and mixed for one hour. Then, the reaction temperature of the obtained reaction mixture was increased up to 190° C. while performing stirring at 200 rpm by use of the same autoclave as in Example 1, and maintained for ten hours. Then, the reaction temperature was cooled to 150° C., and maintained for 96 hours. After the completion of the reaction, the resultant reaction product was analyzed for properties thereof in the same manner as in Example 1. The results are shown in FIGS. 14a and 14b, and Table 1.

In the present example, the reaction mixture has the following molar composition:

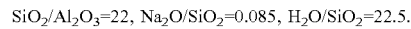
$SiO_2/Al_2O_3=22$, $Na_2O/SiO_2=0.085$, $H_2O/SiO_2=22.5$.

EXAMPLE 13

Figure 15A:
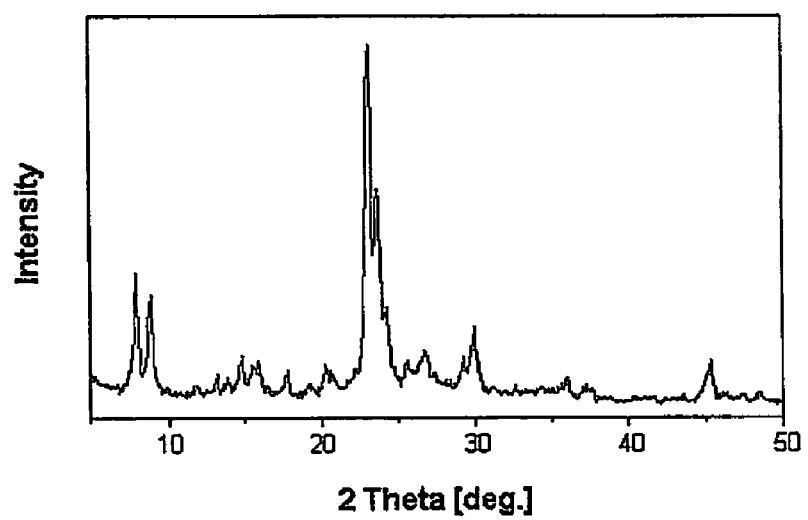
FIG. 15a is a view showing an XRD pattern of ZSM-5 prepared in Example 13 of the present invention.
Figure 15B:
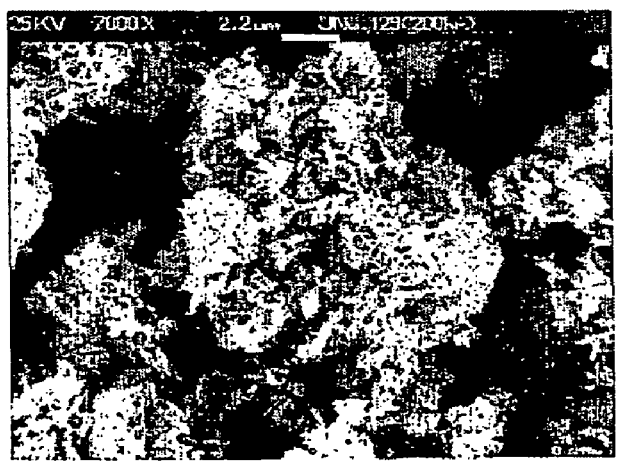
FIG. 15b is a SEM of ZSM-5 prepared in Example 13 of the present invention.

60 g of Ludox AS-40 as a silica source was placed into a beaker 1, to which 30 g of distilled water was added while performing stirring at 200 rpm. Subsequently, stirring was additionally carried out at 200 rpm for three hours. Separately, 5.5 g of powders of sodium aluminate was charged into a beaker 2, together with 62 g of distilled water, and admixed using the magnetic stirrer for three hours. Thereafter, the solution of the beaker 2 was slowly added to the solution of the beaker, along with 32 g of additional distilled water, and mixed for one hour. Then, the reaction temperature of the resultant mixture was increased up to 190° C. while performing stirring at 200 rpm by use of the same autoclave as in Example 1, and maintained for 20 hours. Then, the reaction temperature was cooled to 150° C., and maintained for 200 hours. After the completion of the reaction, the resultant reaction product was analyzed for properties thereof in the same manner as in Example 1. The results are shown in FIGS. 15a and 15b, and Table 1.

In the present example, the reaction mixture has the following molar composition:

$SiO_2/Al_2O_3=20$, $Na_2O/SiO_2=0.07$, $H_2O/SiO_2=22.5$.

EXAMPLE 14

Figure 16A:
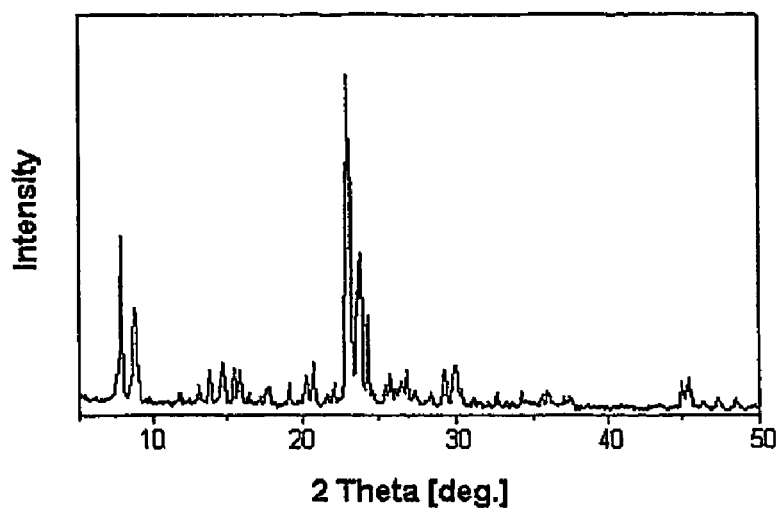
FIG. 16a is a view showing an XRD pattern of ZSM-5 prepared in Example 14 of the present invention.
Figure 16B:
FIG. 16b is a SEM of ZSM-5 prepared in Example 14 of the present invention.

60 g of Ludox AS-40 as a silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 2.2 g of powders of sodium aluminate was charged into a beaker 2, together with 65 g of distilled water and 8.2 g of a 10 wt % NaOH solution, and admixed using the magnetic stirrer for three hours. Thereafter, the solution of the beaker 2 was slowly added to the solution of the beaker 1, along with 35 g of additional distilled water, and mixed for one hour. The reaction temperature of the mixed reaction was increased up to 190° C. while performing stirring at 200 rpm by use of the same autoclave as in Example 1, and maintained for two hours. Then, the reaction temperature was cooled to 165° C., and maintained for 19 hours. After the completion of the reaction, the resultant reaction product was analyzed for properties thereof in the same manner as in Example 1. The results are shown in FIGS. 16a and 16b, and Table 1.

In the present example, the reaction mixture has the following molar composition:

$SiO_2/Al_2O_3=50$, $Na_2O/SiO_2=0.12$, $H_2O/SiO_2=27$.

EXAMPLE 15

Figure 17A:
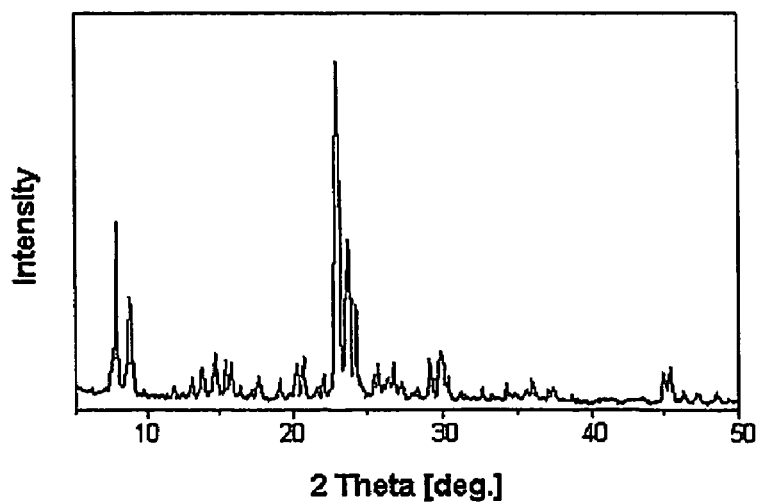
FIG. 17a is a view showing an XRD pattern of ZSM-5 prepared in Example 15 of the present invention.
Figure 17B:
FIG. 17b is a SEM of ZSM-5 prepared in Example 15 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 2.2 g of powders of sodium aluminate was charged into a beaker 2, together with 65 g of distilled water and 9.8 g of a 10 wt % NaOH solution, and then admixed using the magnetic stirrer for three hours. Thereafter, the solution of the beaker 2 was added slowly added to the solution of the beaker 1, along with 35 g of additional distilled water, and mixed for one hour. Then, the reaction temperature of the resulting reaction mixture was increased up to 190° C. while performing stirring at 200 rpm by use of the same autoclave as in Example 1, and maintained for two hours. Then, the reaction temperature was cooled to 165° C., and maintained for 14 hours. After the completion of the reaction, the resultant reaction product was analyzed for properties thereof in the same manner as in Example 1. The results are shown in FIGS. 17a and 17b, and Table 1.

In the present example, the reaction mixture has the following molar composition:

$SiO_2/Al_2O_3=50$, $Na_2O/SiO_2=0.125$, $H_2O/SiO_2=27$.

EXAMPLE 16

Figure 18A:
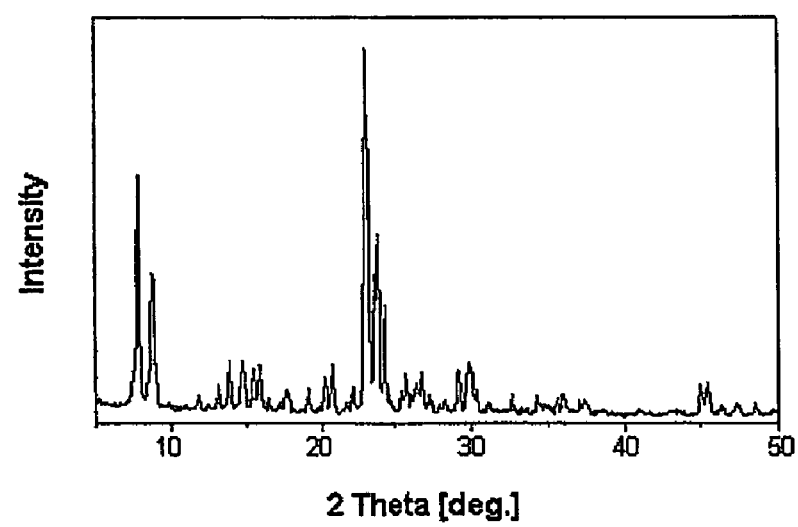
FIG. 18a is a view showing an XRD pattern of ZSM-5 prepared in Example 16 of the present invention.
Figure 18B:
FIG. 18b is a SEM of ZSM-5 prepared in Example 16 of the present invention.

60 g of Ludox AS-40 silica source was introduced into a beaker 1, to which 21.4 g of a 10 wt % NaOH solution was slowly added while performing stirring at 200 rpm, and then 30 g of distilled water was additionally added, followed by stirring at 200 rpm for three hours. Separately, 2.2 g of powders of sodium aluminate was placed into a beaker 2, together with 66 g of distilled water and 6.6 g of a 10 wt % NaOH solution, and admixed using the magnetic stirrer for three hours. Thereafter, the solution of the beaker 2 was slowly added to the solution of the beaker 1, along with 36 g of additional distilled water, and mixed for one hour. Then, the reaction temperature of the obtained reaction mixture was increased up to 190° C. while performing stirring at 200 rpm by use of the same autoclave as in Example 1, and maintained for two hours. Thereafter, the reaction temperature was cooled to 165° C., and maintained for 17 hours. After the completion of the reaction, the resultant reaction product was analyzed for properties thereof in the same manner as in Example 1. The results are shown in FIGS. 18a and 18b, and Table 1.

In the present example, the reaction mixture has the following molar composition:

$SiO_2/Al_2O_3=50$, $Na_2O/SiO_2=0.115$, $H_2O/SiO_2=27$.

EXAMPLE 17

Figure 19A:
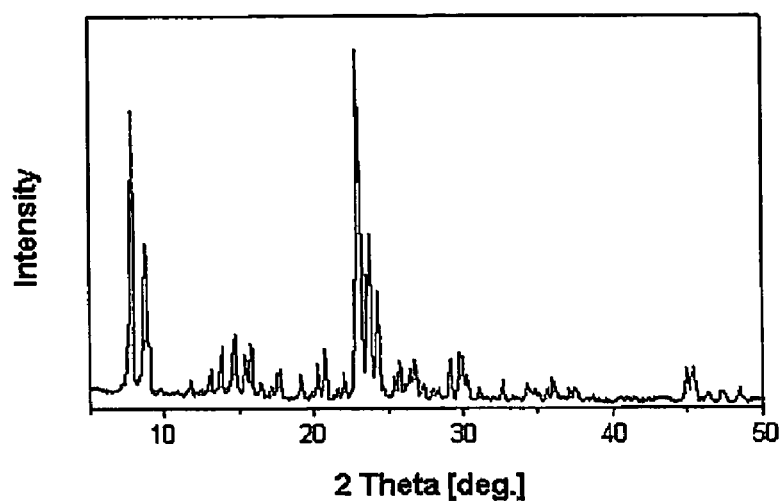
FIG. 19a is a view showing an XRD pattern of ZSM-5 prepared in Example 17 of the present invention.
Figure 19B:
FIG. 19b is a SEM of ZSM-5 prepared in Example 17 of the present invention.

60 g of Ludox AS-40 silica source was introduced into a beaker 1, to which 21.4 g of a 10 wt % NaOH solution was slowly added while performing stirring at 200 rpm, and then 30 g of distilled water was further added, followed by stirring at 200 rpm for three hours. Separately, 2.0 g of powders of sodium aluminate was placed into a beaker 2, together with 66 g of distilled water and 5.9 g of a 10 wt % NaOH solution, and then admixed using the magnetic stirrer for three hours. Subsequently, the solution of the beaker 2 was slowly added to the solution of the beaker 1, along with 36 g of additional distilled water, and mixed for one hour. After the mixing process was completed, the reaction temperature was increased up to 190° C. while performing stirring at 200 rpm by use of the same autoclave as in Example 1, and maintained for two hours. Thereafter, the reaction temperature was cooled to 165° C., and maintained for 19 hours. After the completion of the reaction, the resultant reaction product was analyzed for properties thereof in the same manner as in Example 1. The results are shown in FIGS. 19a and 19b, and Table 1.

In the present example, the reaction mixture has the following molar composition:

$SiO_2/Al_2O_3=56$, $Na_2O/SiO_2=0.11$, $H_2O/SiO_2=27$.

EXAMPLE 18

Figure 20A:
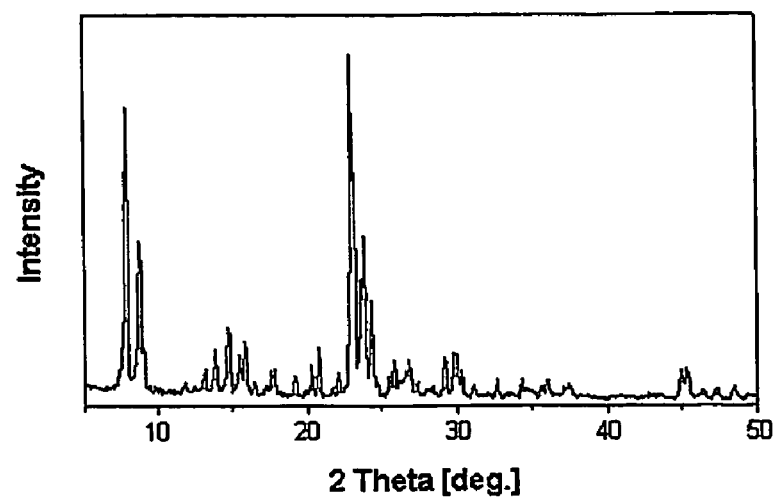
FIG. 20a is a view showing an XRD pattern of ZSM-5 prepared in Example 18 of the present invention.
Figure 20B:
FIG. 20b is a SEM of ZSM-5 prepared in Example 18 of the present invention.

As a silica source, 60 g of Ludox AS-40 was introduced into a beaker 1, to which 21.4 g of a 10 wt % NaOH solution was slowly added while performing stirring at 200 rpm, and then 30 g of distilled water was further added, followed by stirring at 200 rpm for three hours. Separately, 2.0 g of powders of sodium aluminate was placed into a beaker 2, together with 64 g of distilled water and 10.42 g of a 10 wt % NaOH solution, and admixed using the magnetic stirrer for three hours. Thereafter, the solution of the beaker 2 was slowly added to the solution of the beaker 1, along with 34 g of additional distilled water, and mixed for one hour. Then, the reaction temperature of the obtained reaction mixture was increased up to 190° C. while performing stirring at 200 rpm by use of the same autoclave as in Example 1, and maintained for two hours. Then, the reaction temperature was cooled to 165° C., and maintained for 17 hours. After the completion of the reaction, the resultant reaction product was analyzed for properties thereof in the same manner as in Example 1. The results are shown in FIGS. 20a and 20b, and Table 1.

In the present example, the reaction mixture has the following molar composition:

$SiO_2/Al_2O_3=56$, $Na_2O/SiO_2=0.12$, $H_2O/SiO_2=27$.

EXAMPLE 19

Figure 21A:
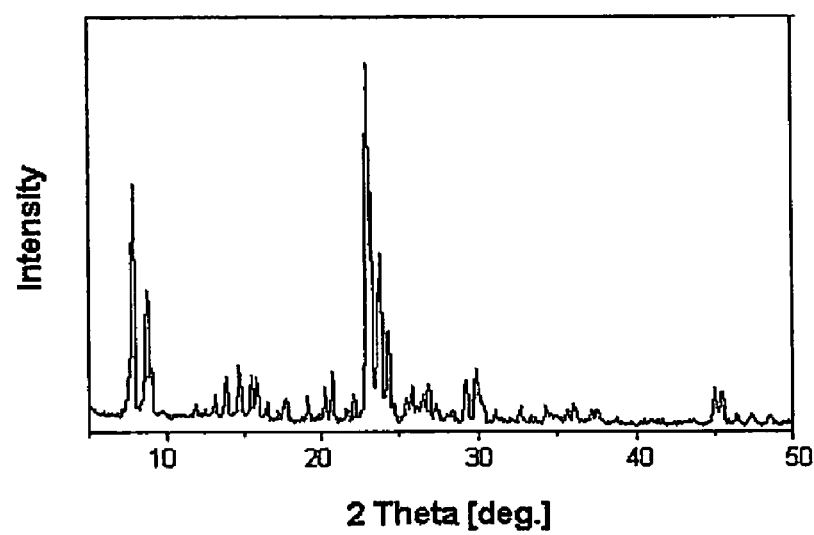
FIG. 21a is a view showing an XRD pattern of ZSM-5 prepared in Example 19 of the present invention.
Figure 21B:
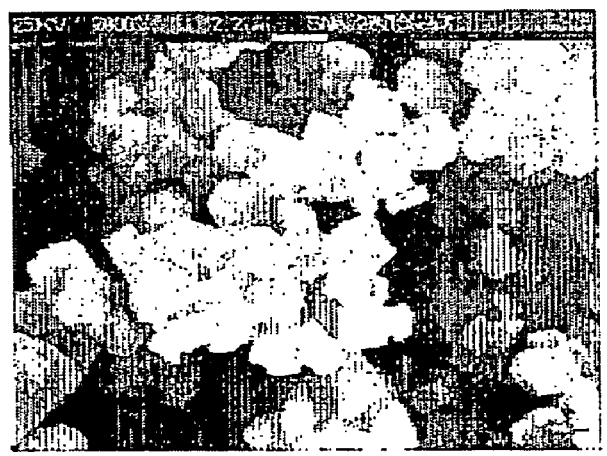
FIG. 21b is a SEM of ZSM-5 prepared in Example 19 of the present invention.

60 g of Ludox AS-40 silica source was charged into a beaker 1, to which 21.4 g of a 10 wt % NaOH solution was slowly added while performing stirring at 200 rpm, and then 30 g of distilled water was further added, followed by stirring at 200 rpm for three hours. Separately, 2.0 g of powders of sodium aluminate, 64 g of distilled water and 13.6 g of a 10 wt % NaOH solution were introduced into a beaker 2, and then admixed using the magnetic stirrer for three hours. Thereafter, the solution of the beaker 2 was slowly added to the solution of the beaker 1, along with 33 g of additional distilled water, and mixed for one hour. Then, the reaction temperature of the obtained reaction mixture was increased up to 190° C. while performing stirring at 200 rpm by use of the same autoclave as in Example 1, and maintained for two hours. Then, the reaction temperature was cooled to 165° C., and maintained for 19 hours. After the completion of the reaction, the resultant reaction product was analyzed for properties thereof in the same manner as in Example 1. The results are shown in FIGS. 21*a* and 21*b*, and Table 1.

In the present example, the reaction mixture has the following molar composition:

$SiO_2/Al_2O_3=67, Na_2O/SiO_2=0.13, H_2O/SiO_2=27.$

EXAMPLE 20

Figure 22A:
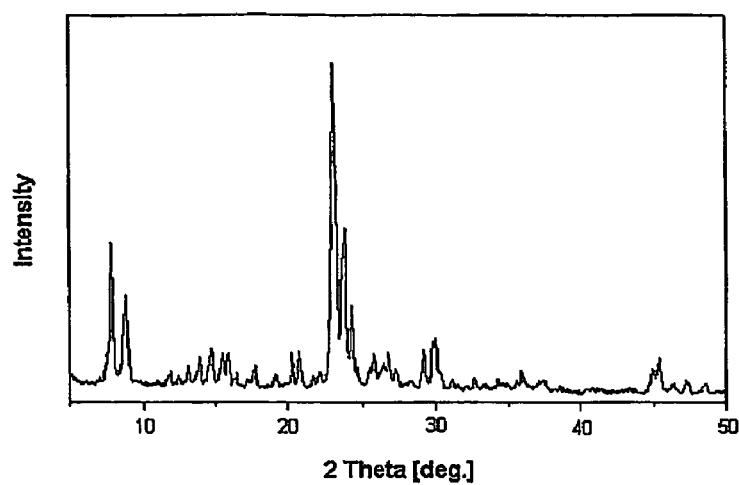
FIG. 22a is a view showing an XRD pattern of ZSM-5 prepared in Example 20 of the present invention.
Figure 22B:
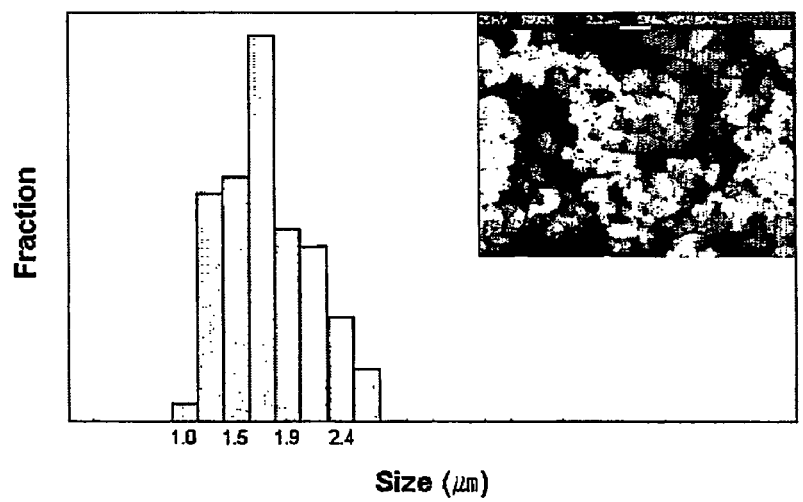
FIG. 22b is a view showing a particle size distribution and a SEM of ZSM-5 prepared in Example 20 of the present invention.

60 g of Ludox AS-40 silica source was placed into a beaker 1, to which 21.4 g of a 10 wt % NaOH solution was slowly added while performing stirring at 200 rpm, and then 30 g of distilled water was added, followed by stirring at 200 rpm for three hours. Separately, 3.3 g of powders of sodium aluminate, 51.6 g of distilled water and 2.2 g of a 10 wt % NaOH solution were introduced into a beaker 2, and then admixed using the magnetic stirrer for three hours. Thereafter, the solution of the beaker 2 was slowly added to the solution of the beaker 1, along with 37.8 g of additional distilled water, and mixed for one hour. Then, the reaction temperature of the obtained reaction mixture was increased up to 190° C. while performing stirring at 200 rpm by use of the same autoclave as in Example 1, and maintained for two hours. Then, the reaction temperature was cooled to 165° C., and maintained for 20 hours. After the completion of the reaction, the resultant reaction product was analyzed for properties thereof in the same manner as in Example 1. The results are shown in FIGS. 22*a* and 22*b*, and Table 1.

In the present example, the reaction mixture has the following molar composition:

$SiO_2/Al_2O_3=33, Na_2O/SiO_2=0.115, H_2O/SiO_2=27.$

COMPARATIVE EXAMPLE 2

Figure 23A:
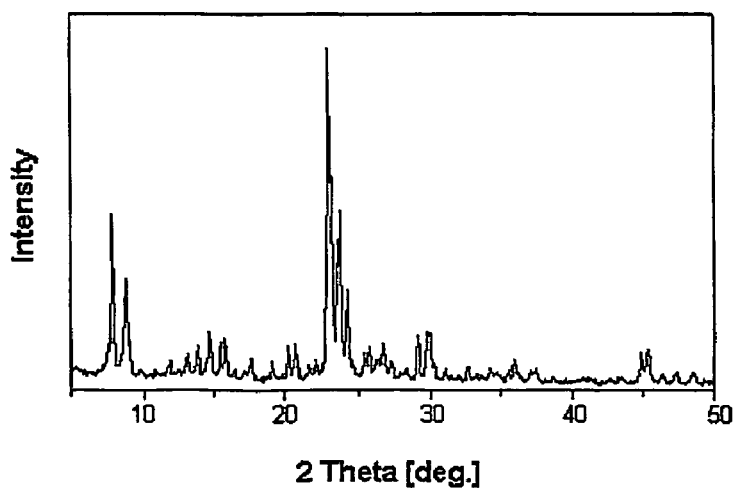
FIG. 23a is a view showing an XRD pattern of ZSM-5 prepared in Comparative Example 2 of the present invention.
Figure 23B:
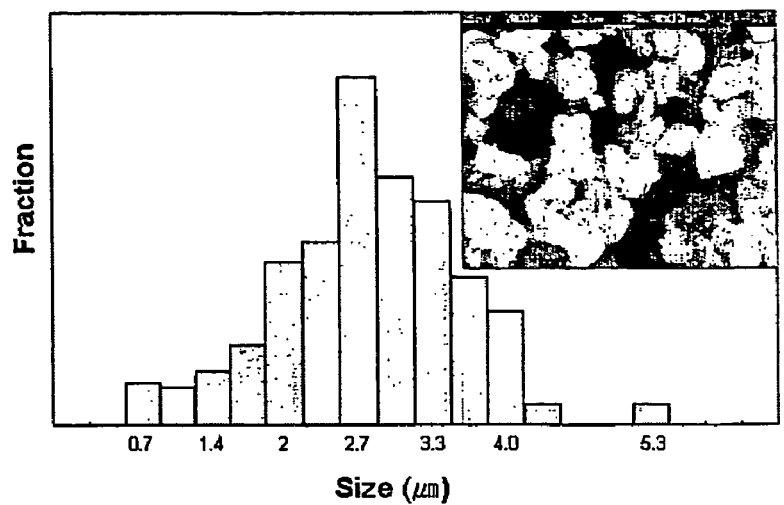
FIG. 23b is a view showing a particle size distribution and a SEM of ZSM-5 prepared in Comparative Example 2 of the present invention.

60 g of Ludox AS-40 silica source was introduced into a beaker 1, to which 21.4 g of a 10 wt % NaOH solution was slowly added while performing stirring at 200 rpm. Further, 30 g of distilled water was added to the beaker 1, followed by stirring at 200 rpm for three hours. Separately, 3.3 g of powders of sodium aluminate, 51.6 g of distilled water and 2.2 g of a 10 wt % NaOH solution were introduced into a beaker 2, and then admixed using the magnetic stirrer for three hours. Thereafter, the solution of the beaker 2 was slowly added to the solution of the beaker 1, along with 37.8 g of additional distilled water, and mixed for one hour. Then, the temperature of the reaction mixture was increased up to 190° C. while performing stirring at 200 rpm by use of the same autoclave as in Example 1, and maintained for ten hours. After the completion of the reaction, the resultant reaction product was analyzed for properties thereof in the same manner as in Example 1. The results are shown in FIGS. 23*a* and 23*b*, and Table 1.

In this comparative example, the reaction mixture has the following molar composition:

$SiO_2/Al_2O_3=33, Na_2O/SiO_2=0.115, H_2O/SiO_2=27.$

EXAMPLE 21

Figure 24A:
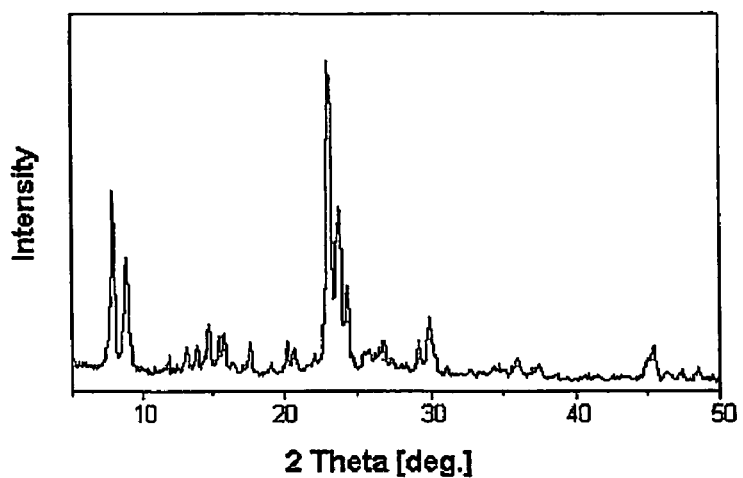
FIG. 24a is a view showing an XRD pattern of ZSM-5 prepared in Example 21 of the present invention.
Figure 24B:
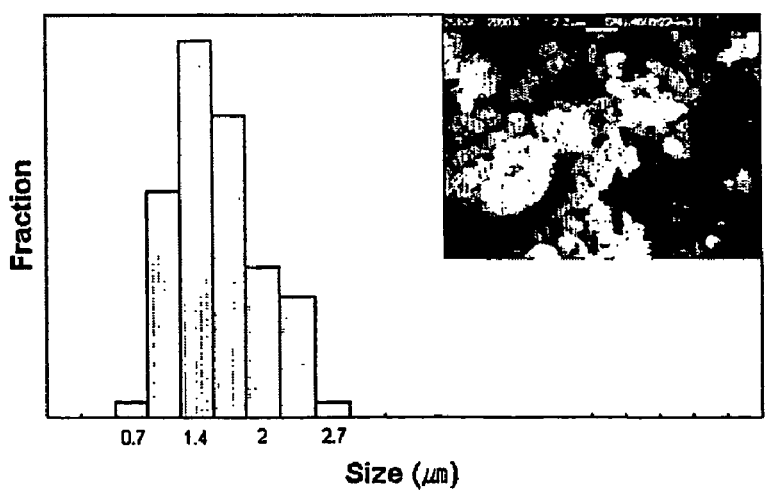
FIG. 24b is a view showing a particle size distribution and a SEM of ZSM-5 prepared in Example 21 of the present invention.

60 g of Ludox AS-40 silica source was charged into a beaker 1, to which 14.4 g of a 10 wt % NaOH solution was slowly added while performing stirring at 200 rpm, and then 30 g of distilled water was further added, followed by stirring at 200 rpm for three hours. Separately, 4.4 g of powders of sodium aluminate and 71.9 g of distilled water were introduced into a beaker 2, and then admixed using the magnetic stirrer for three hours. Thereafter, the solution of the beaker 2 and 41.9 g of additional distilled water were slowly added to the solution of the beaker 1, and mixed for one hour. Then, the reaction temperature of the resultant mixture was increased up to 190° C. while performing stirring at 200 rpm by use of the same autoclave as in Example 1, and maintained for six hours. Then, the reaction temperature was cooled to 165° C., and maintained for 22 hours. After the completion of the reaction, the resultant reaction product was analyzed for properties thereof in the same manner as in Example 1. The results are shown in FIGS. 24*a* and 24*b*, and Table 1.

In the present example, the reaction mixture has the following molar composition:

$SiO_2/Al_2O_3=25, Na_2O/SiO_2=0.10, H_2O/SiO_2=27.$

COMPARATIVE EXAMPLE 3

Figure 25A:
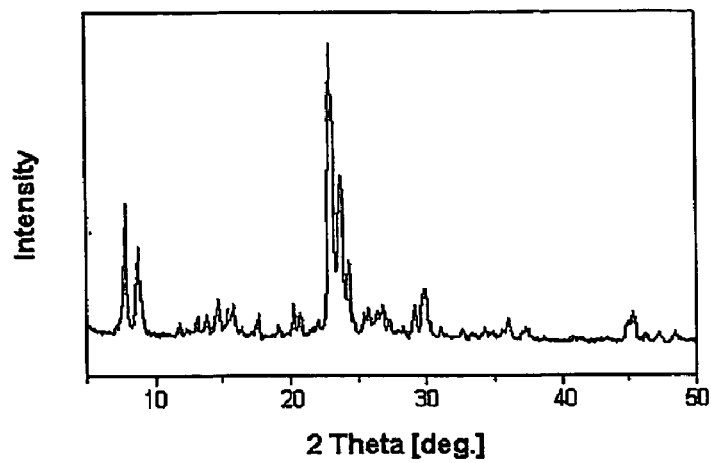
FIG. 25a is a view showing an XRD pattern of ZSM-5 prepared in Comparative Example 3 of the present invention.
Figure 25B:
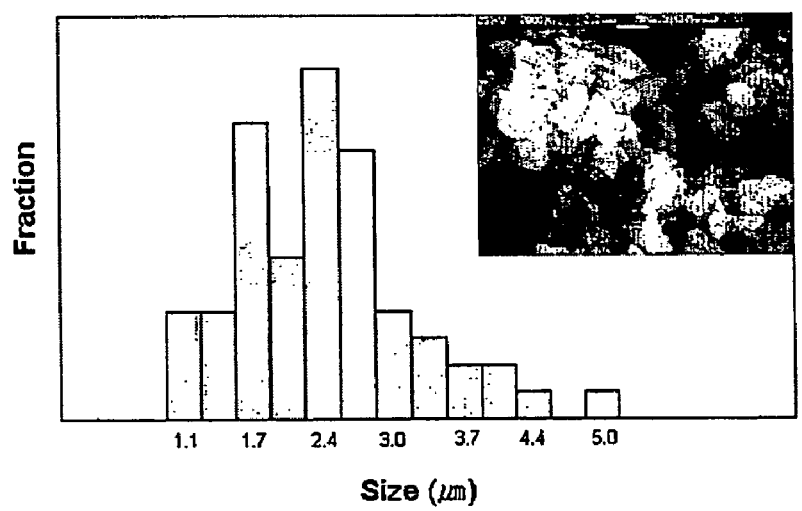
FIG. 25b is a view showing a particle size distribution and a SEM of ZSM-5 prepared Comparative Example 3 of the present invention.

60 g of Ludox AS-40 silica source was introduced into a beaker 1, to which 14.4 g of a 10 wt % NaOH solution was slowly added while performing stirring at 200 rpm, and then 30 g of distilled water was further added, followed by stirring at 200 rpm for three hours. Separately, 4.4 g of powders of sodium aluminate and 71.9 g of distilled water were introduced into a beaker 2, and then admixed using the magnetic stirrer for three hours. Thereafter, the solution of the beaker 2 and 41.9 g of additional distilled water were slowly added to the solution of the beaker 1, and mixed for one hour. Then, the reaction temperature of the resultant mixture was increased up to 190° C. while performing stirring at 200 rpm by use of the same autoclave as in Example 1, and maintained for 17 hours. After the completion of the reaction, the resultant reaction product was analyzed for properties thereof in-the same manner as in Example 1. The results are shown in FIGS. 25*a* and 25*b*, and Table 1.

In this comparative example, the reaction mixture has the following molar composition:

$SiO_2/Al_2O_3=25, Na_2O/SiO_2=0.10, H_2O/SiO_2=27.$

The following examples 22-26 were performed to confirm the effects of the nucleation time, of the two-step reaction (nucleation and crystallization), on the resultant reaction product.

EXAMPLE 22

Figure 26A:
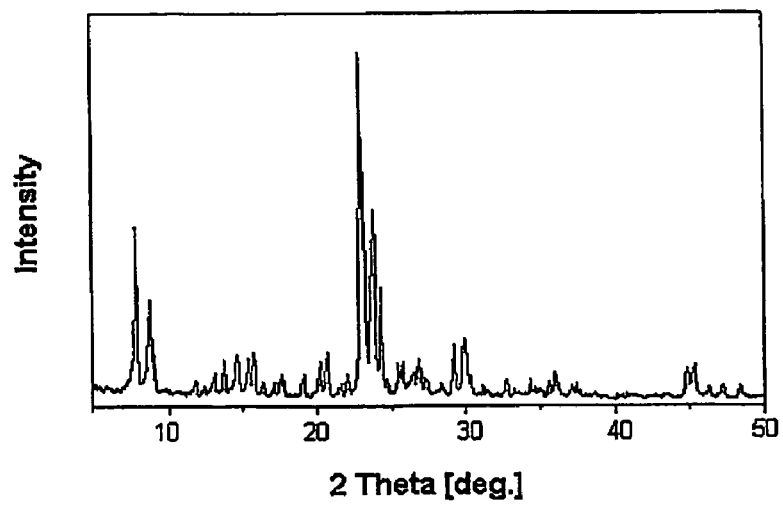
FIG. 26a is a view showing an XRD pattern of ZSM-5 prepared in Example 22 of the present invention.
Figure 26B:
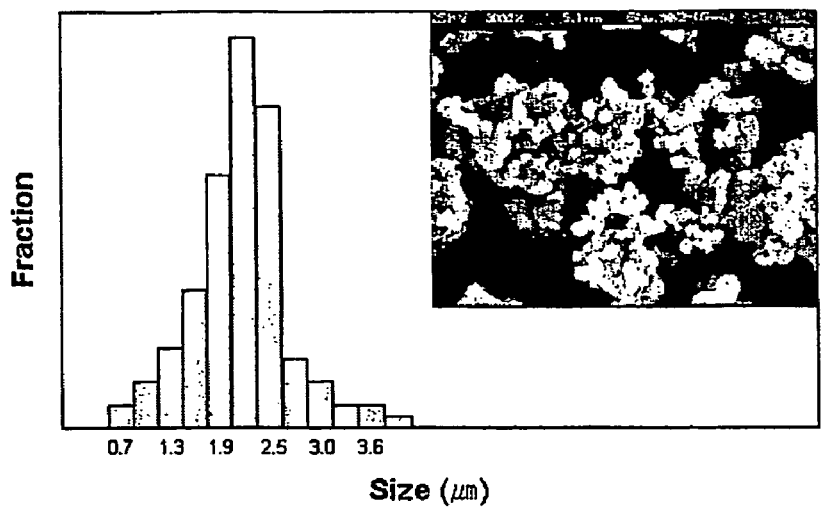
FIG. 26b is a view showing a particle size distribution and a SEM of ZSM-5 prepared in Example 22 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 2.2 g of powders of sodium aluminate, 49.6 g of distilled water and 14.6 g of a 10 wt % NaOH solution were introduced into a beaker 2, and then admixed using the magnetic stirrer for three hours. Thereafter, the solution of the beaker 2 was slowly added to the solution of the beaker 1, along with 19.7 g of additional distilled water, and mixed for one hour. Then, the reaction temperature of the resultant mixture was increased up to 190° C. while performing stirring at 200 rpm by use of the same autoclave as in Example 1, and maintained for two hours. Then, the reaction temperature was cooled to 165° C., and maintained for 16 hours. After the completion of the reaction, the resultant reaction product was analyzed for properties thereof in the same manner as in Example 1. The results are shown in FIGS. 26a and 26b, and Table 2.

In the present example, the reaction mixture has the following molar composition:

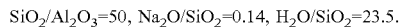
$SiO_2/Al_2O_3=50$, $Na_2O/SiO_2=0.14$, $H_2O/SiO_2=23.5$.

EXAMPLE 23

Figure 27A:
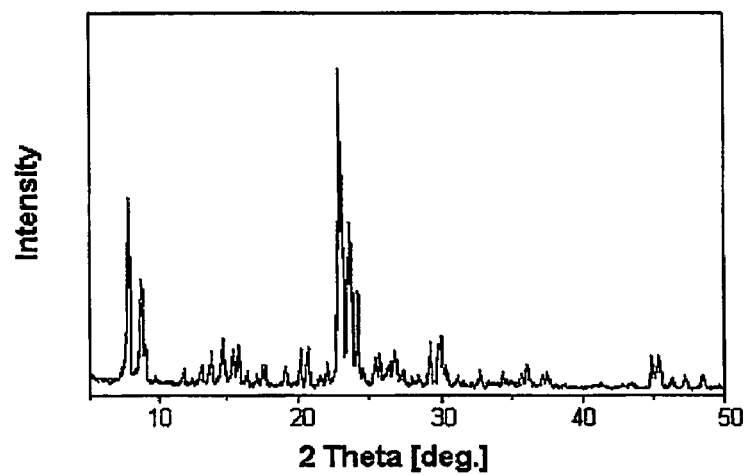
FIG. 27a is a view showing an XRD pattern of ZSM-5 prepared in Example 23 of the present invention.
Figure 27B:
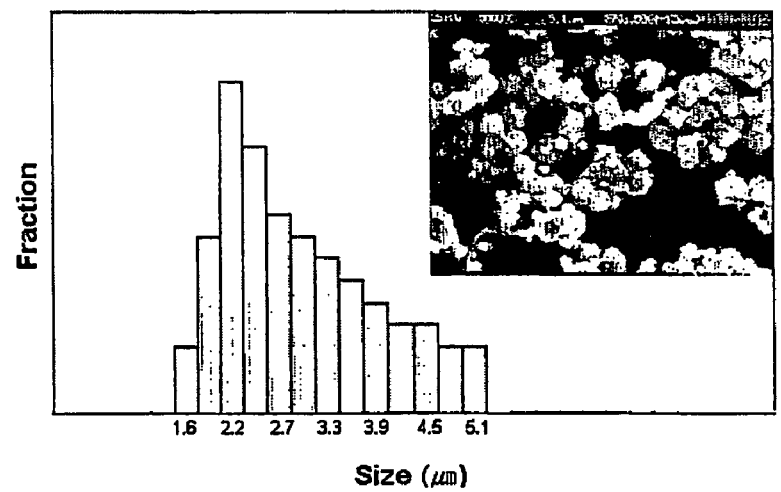
FIG. 27b is a view showing a particle size distribution and a SEM of ZSM-5 prepared in Example 23 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 2.2 g of powders of sodium aluminate, 49.6 g of distilled water and 14.6 g of a 10 wt % NaOH solution were introduced into a beaker 2, and then admixed using the magnetic stirrer for three hours. Thereafter, the solution of the beaker 2 was slowly added to the solution of the beaker 1, along with 19.7 g of additional distilled water, and mixed for one hour. Then, the reaction temperature of the resultant mixture was increased up to 190° C. while performing stirring at 200 rpm by use of the same autoclave as in Example 1, and maintained for four hours. Then, the reaction temperature was cooled to 165° C., and maintained for 12 hours. After the completion of the reaction, the resultant reaction product was analyzed for properties thereof in the same manner as in Example 1. The results are shown in FIGS. 27a and 27b, and Table 2.

In the present example, the reaction mixture has the following molar composition:

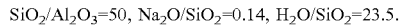
$SiO_2/Al_2O_3=50$, $Na_2O/SiO_2=0.14$, $H_2O/SiO_2=23.5$.

EXAMPLE 24

Figure 28A:
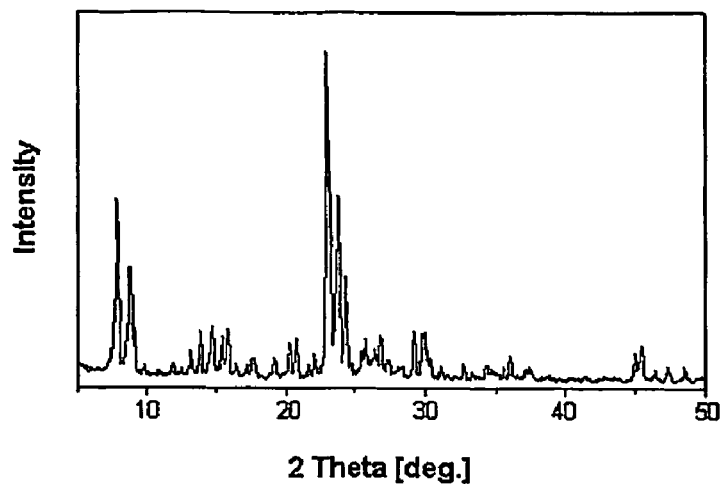
FIG. 28a is a view showing an XRD pattern of ZSM-5 prepared in Example 24 of the present invention.
Figure 28B:
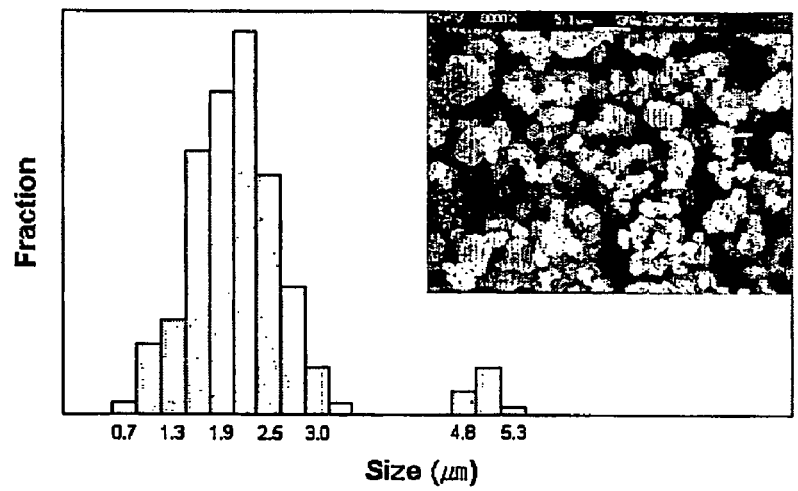
FIG. 28b is a view showing a particle size distribution and a SEM of ZSM-5 prepared in Example 24 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 2.0 g of powders of sodium aluminate, 70.6 g of distilled water and 12.3 g of a 10 wt % NaOH solution were introduced into a beaker 2, and then admixed using the magnetic stirrer for three hours. Thereafter, the solution of the beaker 2 was slowly added to the solution of the beaker 1, along with 40.6 g of additional distilled water, and mixed for one hour. Then, the reaction temperature of the resultant mixture was increased up to 190° C. while performing stirring at 200 rpm by use of the same autoclave as in Example 1, and maintained for three hours. Then, the reaction temperature was cooled to 165° C., and maintained for 20 hours. After the completion of the reaction, the resultant reaction product was analyzed for properties thereof in the same manner as in Example 1. The results are shown in FIGS. 28a and 28b, and Table 2.

In the present example, the reaction mixture has the following molar composition:

$SiO_2/Al_2O_3=56$, $Na_2O/SiO_2=0.13$, $H_2O/SiO_2=29$.

EXAMPLE 25

Figure 29A:
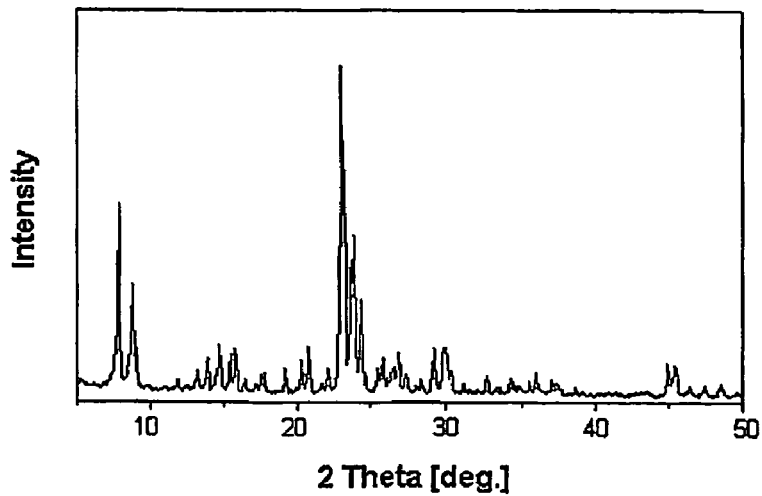
FIG. 29a is a view showing an XRD pattern of ZSM-5 prepared in Example 25 of the present invention.
Figure 29B:
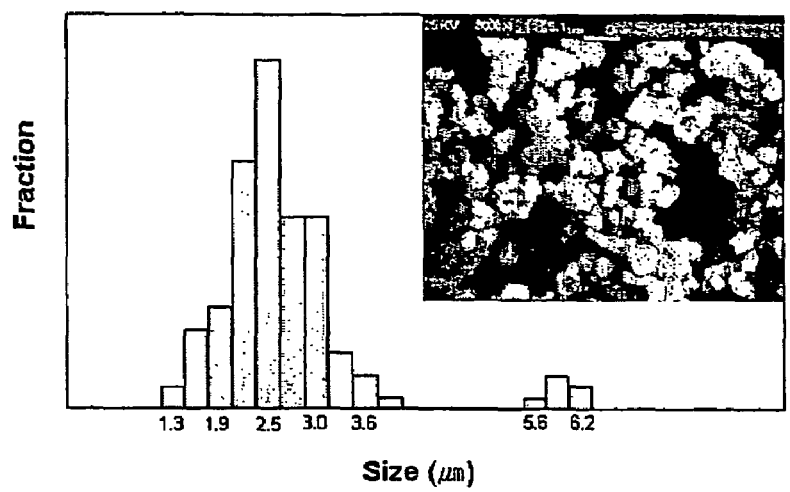
FIG. 29b is a view showing a particle size distribution and a SEM of ZSM-5 prepared in Example 25 of the present invention.

60 g of Ludox AS-40 silica source was charged into a beaker 1, to which 21.4 g of a 10 wt % NaOH solution was slowly added while performing stirring at 200 rpm, and then 30 g of distilled water was further added, followed by stirring at 200 rpm for three hours. Separately, 2.0 g of powders of sodium aluminate, 70.6 g of distilled water and 12.3 g of a 10 wt % NaOH solution were introduced into a beaker 2, and then admixed using the magnetic stirrer for three hours. Thereafter, the solution of the beaker 2 was slowly added to the solution of the beaker 1, along with 40.6 g of additional distilled water, and mixed for one hour. Then, the reaction temperature of the resultant mixture was increased up to 190° C. while performing stirring at 200 rpm by use of the same autoclave as in Example 1, and maintained for four hours. Then, the reaction temperature was cooled to 165° C., and maintained for 17 hours. After the completion of the reaction, the resultant reaction product was analyzed for properties thereof in the same manner as in Example 1. The results are shown in FIGS. 29a and 29b, and Table 2.

In the present example, the reaction mixture has the following molar composition:

$SiO_2/Al_2O_3=56$, $Na_2O/SiO_2=0.13$, $H_2O/SiO_2=29$.

EXAMPLE 26

Figure 30A:
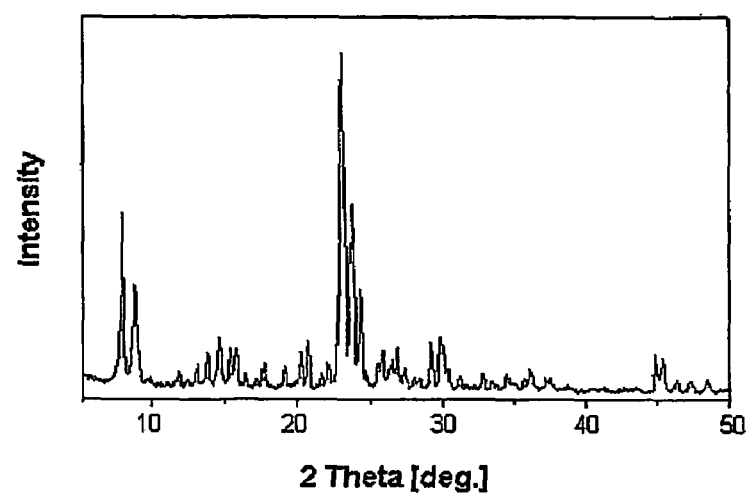
FIG. 30a is a view showing an XRD pattern of ZSM-5 prepared in Example 26 of the present invention.
Figure 30B:
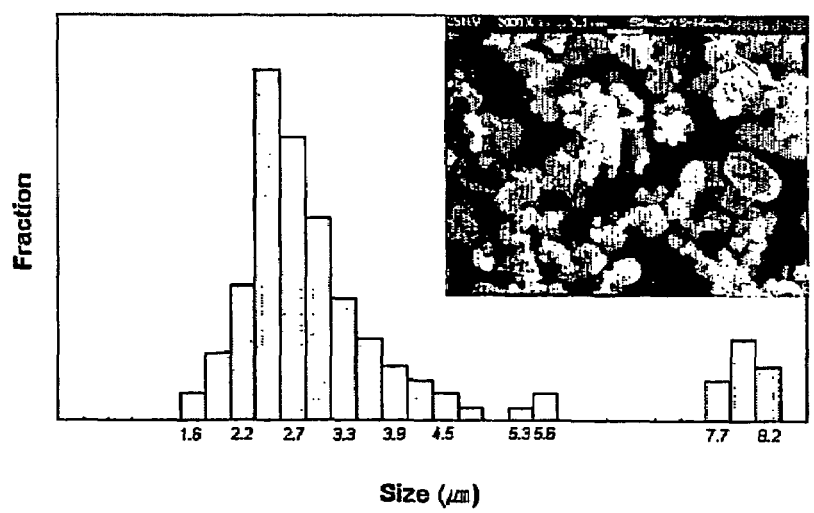
FIG. 30b is a view showing a particle size distribution and a SEM of ZSM-5 prepared in Example 26 of the present invention.

60 g of Ludox AS-40 silica source was placed into a beaker 1, to which 21.4 g of a 10 wt % NaOH solution was slowly added while performing stirring at 200 rpm, and then 30 g of distilled water was further added, followed by stirring at 200 rpm for three hours. Separately, 2.0 g of powders of sodium aluminate, 70.6 g of distilled water and 12.3 g of a 10 wt % NaOH solution were introduced into a beaker 2, and then admixed using the magnetic stirrer for three hours. Thereafter, the solution of the beaker 2 was slowly added to the solution of the beaker 1, along with 40.6 g of additional distilled water, and mixed for one hour. Then, the reaction temperature of the resultant mixture was increased up to 190° C. while performing stirring at 200 rpm by use of the same autoclave as in Example 1, and maintained for five hours. The reaction temperature was cooled to 165° C., and maintained for 14 hours. After the completion of the reaction, the resultant reaction product was analyzed for properties thereof in the same manner as in Example 1. The results are shown in FIGS. 30a and 30b, and Table 2.

In the present example, the reaction mixture has the following molar composition:

$SiO_2/Al_2O_3=56$, $Na_2O/SiO_2=0.13$, $H_2O/SiO_2=29$.

TABLE 1

| Ex. No. | Reaction (hrs) 190° C. | Reaction (hrs) 150° C. | SiO$_2$/ Al$_2$O$_3$ | Na$_2$O/ SiO$_2$ | BET Surface (m$^2$/g)* | Average Crystal (μm) |
|---|---|---|---|---|---|---|
| 1 | 2 | 40 | 67 | 0.115 | 351 | 2 |
| 2 | 2 | 35 | 56 | 0.115 | 365 | 2 |
| 3 | 2 | 35 | 50 | 0.10 | 373 | 2 |
| 4 | 2 | 30 | 50 | 0.115 | 379 | 2 |
| C. Ex. 1 | 9 | 0 | 50 | 0.115 | 370 | 6 |
| 5 | 2 | 30 | 50 | 0.14 | 358 | 2 |
| 6 | 2 | 36 | 40 | 0.09 | 375 | 2 |
| 7 | 2 | 30 | 40 | 0.14 | 363 | 2 |
| 8 | 2 | 42 | 33 | 0.115 | 364 | 2 |
| 9 | 2 | 36 | 33 | 0.115 | 375 | 2 |
| 10 | 2 | 42 | 29 | 0.115 | 362 | 2 |
| 11 | 2 | 66 | 25 | 0.10 | 370 | 1.5 |
| 12 | 10 | 96 | 22 | 0.085 | 387 | 1.5 |
| 13 | 20 | 200 | 20 | 0.07 | 394 | 1 |
| 14 | 2 | 19 | 50 | 0.12 | 379 | 2 |
| 15 | 2 | 14 | 50 | 0.125 | 355 | 3 |
| 16 | 2 | 17 | 50 | 0.115 | 387 | 3 |
| 17 | 2 | 19 | 56 | 0.11 | 392 | 3 |
| 18 | 2 | 17 | 56 | 0.12 | 386 | 3 |
| 19 | 2 | 19 | 67 | 0.13 | 391 | 3 |
| 20 | 2 | 20 | 33 | 0.115 | 386 | 2 |
| C. Ex. 2 | 10 | 0 | 33 | 0.115 | 373 | 3 |
| 21 | 6 | 22 | 25 | 0.10 | 390 | 2 |
| C. Ex. 3 | 17 | 0 | 25 | 0.10 | 379 | 3 |

TABLE 2

| Ex. No. | Reaction (hrs) 190° C. | Reaction (hrs) 165° C. | SiO$_2$/ Al$_2$O$_3$ | Na$_2$O/ SiO$_2$ | BET Surface (m$^2$/g)* | Average Crystal (μm) |
|---|---|---|---|---|---|---|
| 22 | 2 | 16 | 50 | 0.14 | 377 | 2.2 |
| 23 | 4 | 12 | 50 | 0.14 | 384 | 3.0 |
| 24 | 3 | 20 | 56 | 0.13 | 388 | 2.5 |
| 25 | 4 | 17 | 56 | 0.13 | 386 | 2.7 |
| 26 | 5 | 14 | 56 | 0.13 | 383 | 3.2 |

*BET surface area measured at 5 point of P/P$_0$ in the range of 0.01-0.05

As apparent from Table 1, in cases where ZSM-5 is prepared through a two-step process (nucleation and crystallization) at variable temperatures according to the present invention, ZSM-5 having excellent properties as well as a specific surface area of 350 or more can be obtained. In Comparative Example 1 characterized by performing the nucleation and the crystallization at 190° C. and Example 4 characterized by performing the nucleation (190° C.) and the crystallization (150° C.), there is a remarkable difference between the crystal sizes and the particle size distributions even though the reaction mixture having the same composition is used. That is, in Example 4, the average crystal size amounts to about 2 μm as in FIG. 5b, whereas Comparative Example 1 has the average crystal size in the range of about 5-6 μm, with a very broad particle size distribution, as shown in FIG. 6b.

Further, as in Table 2, in cases of Examples 22-26 having SiO$_2$/Al$_2$O$_3$ of 50 or 56, it can be seen that the resultant reaction product has a large crystal size and a broad particle size distribution as the nucleation time prolongs. In addition, when SiO$_2$/Al$_2$O$_3$ is controlled to 33 (Example 20 and Comparative Example 2) and 25 (Example 21 and Comparative Example 3), the two-step process using the variable temperatures results in a further decreased crystal size and particle size distribution than those of the synthesis process using the single temperature, as shown in Table 1, FIG. 22b (Example 20), FIG. 23b (Comparative Example 2), FIG. 24b (Example 21) and FIG. 25b (Comparative Example 3).

As a result, the reaction mixture is subjected to the two-step process at variable temperatures, and the nucleation as the first step is adjusted in the reaction time thereof, whereby the resulting ZSM-5 can be easily controlled in the crystal size and the particle size distribution while not affecting the BET surface area

INDUSTRIAL APPLICABILITY

As described above, the present invention provides a method of preparing ZSM-5 through a two-step process at variable temperatures in the absence of an organic template and a crystallization seed. By the above method, superior ZSM-5 having substantially 100% crystallinity and better quality can be assured while a crystal size and a particle size distribution are easily controlled.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A method of preparing ZSM-5, comprising the following steps of:
   mixing a silica source, an alkali metal oxide source, an alumina source and water, to prepare a reaction mixture having a molar composition of M$_2$O/SiO$_2$(M: alkali metal ion) of 0.07-0.14, H$_2$O/SiO$_2$ of 15-42 and SiO$_2$/Al$_2$O$_3$ of 20-100;
   maintaining the reaction mixture at 180-210° C. for a reaction time controlled in a range of 2-20 hours according to an intended crystal size and a particle size distribution of the ZSM-5, to obtain a nucleated reaction mixture; and
   maintaining the nucleated reaction mixture at 130-170° C. for 10-200 hours to form crystals of the ZSM-5.

2. The method as defined in claim 1, wherein the alkali metal oxide source is alkali metal hydroxide.

3. The method as defined in claim 1, wherein the alkali metal is sodium.

4. The method as defined in claim 1, wherein a molar ratio of the M$_2$O/SiO$_2$ is in the range of 0.09-0.14 when the molar ratio of the SiO$_2$/Al$_2$O$_3$ is 29 or higher.

5. The method as defined in claim 1, wherein the molar ratio of the M$_2$O/SiO$_2$ is in the range of 0.07-0.1 when the molar ratio of the SiO$_2$/Al$_2$O$_3$ is less than 29.

6. The method as defined in claim 1, wherein the alumina source is sodium aluminate or aluminum hydroxide.

7. The method as defined in claim 1, wherein the silica source is selected from the group consisting of colloidal silica, sodium silicate, white carbon and boehmite.

8. The method as defined in claim 1, wherein the ZSM-5 has an average crystal size of 1-6 μm.

9. The method as defined in claim 8, wherein the ZSM-5 has an average crystal size of 2-3 μm.

10. The method as defined in claim 4, wherein the ZSM-5 has a hexagonal crystal morphology.

11. The method as defined in claim 5, wherein the ZSM-5 has a spiral crystal morphology.

12. The method as defined in claim 5, wherein the nucleating step is performed for 10-20 hours when the molar ratio of the SiO$_2$/Al$_2$O$_3$ is not more than 22.

13. The method as defined in claim 12, wherein the crystallizing step is performed for 96-200 hours.

14. The method as defined in claim 1, wherein the crystallizing step is performed until crystallinity reaches substantially 100%.

15. A method of preparing ZSM-5, comprising the following steps of:
- admixing a silica source, an alkali metal oxide source and water, to prepare a first aqueous solution;
- separately admixing an alumina source, an alkali metal oxide source and water, to prepare a second aqueous solution;
- mixing the first aqueous solution with the second aqueous solution while being optionally added with water, to prepare a reaction mixture having a molar composition of $M_2O/SiO_2$ of 0.07-0.14, $H_2O/SiO_2$ of 15-42 and $SiO_2/Al_2O_3$ of 20-100;
- maintaining the reaction mixture at 180-210° C. for a reaction time controlled in the range of 2-20 hours according to an intended crystal size and a particle size distribution of the ZSM-5, to obtain a nucleated reaction mixture; and
- maintaining the nucleated reaction mixture at 130-170° C. for 10-200 hours to form crystals of the ZSM-5.

16. The method as defined in claim 15, wherein the silica source in the first aqueous solution amounts to 21.5-26.7 wt %, and the alumina source in the second aqueous solution amounts to 0.9-4.4 wt %.

17. The method as defined in claim 15, wherein the alkali metal oxide source is alkali metal hydroxide.

18. A method of preparing ZSM-5, comprising the following steps of:
- admixing a silica source, an alkali metal oxide source and water, to prepare a first aqueous solution;
- separately admixing an alumina source and water, to prepare a second aqueous solution;
- mixing the first aqueous solution with the second aqueous solution while being optionally added with water, to prepare a reaction mixture having a molar composition of $M_2O/SiO_2$ of 0.07-0.14, $H_2O/SiO_2$ of 15-42 and $SiO_2/Al_2O_3$ of 20-100;
- maintaining the reaction mixture at 180-210° C. for a reaction time controlled in the range of 2-20 hours according to an intended crystal size and a particle size distribution of the ZSM-5, to obtain a nucleated reaction mixture; and
- maintaining the nucleated reaction mixture at 130-170° C. for 10-200 hours to form crystals of the ZSM-5.

19. The method as defined in claim 18, wherein the silica source in the first aqueous solution amounts to 21.5-26.7 wt %, and the alumina source in the second aqueous solution amounts to 0.9-4.4 wt %.

20. The method as defined in claim 18, wherein the alkali metal oxide source is alkali metal hydroxide.

* * * * *